(12) United States Patent
Chang et al.

(10) Patent No.: US 9,946,298 B2
(45) Date of Patent: Apr. 17, 2018

(54) WEARABLE DEVICE INTERACTIVE SYSTEM

(71) Applicant: MediaTek Inc., Hsinchu (TW)

(72) Inventors: Chih-Kai Chang, Taichung (TW); Yu-Hao Huang, Kaohsiung (TW); Chun-Chia Chen, Hsinchu (TW); Tsu-Ming Liu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 29 days.

(21) Appl. No.: 15/077,667

(22) Filed: Mar. 22, 2016

(65) Prior Publication Data
US 2016/0202724 A1 Jul. 14, 2016

Related U.S. Application Data

(60) Provisional application No. 62/144,515, filed on Apr. 8, 2015.

(51) Int. Cl.
| | |
|---|---|
| *G06F 3/16* | (2006.01) |
| *G06F 1/16* | (2006.01) |
| *G06F 3/01* | (2006.01) |
| *G06F 3/03* | (2006.01) |
| *G06F 3/043* | (2006.01) |

(52) U.S. Cl.
CPC .............. *G06F 1/163* (2013.01); *G06F 3/017* (2013.01); *G06F 3/0304* (2013.01); *G06F 3/043* (2013.01)

(58) Field of Classification Search
CPC ........ G06F 1/163; G06F 3/017; G06F 3/0304; G06F 3/043; G06F 3/041–3/047; G06F 2203/04101–2203/04113

USPC .......................................... 345/156, 173–178
See application file for complete search history.

(56) References Cited

U.S. PATENT DOCUMENTS

| 8,199,115 B2 * | 6/2012 | Katz ....................... G06F 3/017 345/169 |
| 8,319,727 B2 * | 11/2012 | Norieda ................... G06F 3/011 345/156 |
| 9,261,966 B2 * | 2/2016 | Berestov ................. G06F 3/017 |
| 2008/0244468 A1 * | 10/2008 | Nishihara ............... G06F 3/017 715/863 |
| 2011/0242305 A1 * | 10/2011 | Peterson ............... G01S 15/003 348/77 |
| 2014/0181740 A1 * | 6/2014 | Gachoka ............. G06F 3/04842 715/802 |
| 2014/0313294 A1 * | 10/2014 | Hoffman ............... G06F 3/0425 348/47 |
| 2015/0133193 A1 * | 5/2015 | Stotler .................... G06F 1/163 455/557 |
| 2015/0324000 A1 * | 11/2015 | Park ........................ G06F 3/014 345/156 |

(Continued)

*Primary Examiner* — Stephen Sherman
(74) *Attorney, Agent, or Firm* — Han IP Corporation; Andy M. Han

(57) ABSTRACT

A wearable device interactive system and techniques, methods and apparatuses thereof are described. A wearable device may sense a user input by a hand of the user, analyze the user input, and perform one or more operations responsive to a result of the analysis. For example, the wearable device may launch an application corresponding to the user input. As another example, the wearable device may recognize a text at a fingertip of the user and determine a location of the wearable device to determine a context, and launch an application corresponding to the context.

13 Claims, 19 Drawing Sheets

(56) References Cited

U.S. PATENT DOCUMENTS

2015/0363001 A1* 12/2015 Malzbender ............ G06F 3/017
                                                    706/18
2016/0054849 A1*  2/2016 Steiger .................. G06F 3/0414
                                                   345/173

* cited by examiner

WEARABLE DEVICE INTERACTIVE SYSTEM

CROSS REFERENCE TO RELATED PATENT APPLICATION

The present disclosure claims the priority benefit of U.S. Provisional Patent Application No. 62/144,515, filed on 8 Apr. 2015, which is incorporated by reference in its entirety.

TECHNICAL FIELD

The present disclosure is generally related to wearable devices and, more particularly, to an interactive system for wearable devices.

BACKGROUND

Unless otherwise indicated herein, approaches described in this section are not prior art to the claims listed below and are not admitted to be prior art by inclusion in this section.

Wearable devices generally are devices that are clothing, apparels and/or accessories worn by a user and incorporating computer and/or advanced electronic technologies. Examples of wearable devices include smart watches, smart bracelets, fitness bands and the like. Wearable devices make technology pervasive by interweaving technology into a user's daily life. A wearable device has either no display or a small display for the user to view information provided by the wearable device. Even when there is a display, however, the size of a viewable area of the display is usually less than 1.5 in$^2$. For instance, a smart watch may be equipped with a touch-sensing display for a user to interact with the smart watch. Nevertheless, it is not easy for the user to user his/her finger to operate the tiny display.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Implementations in accordance with the present disclosure provide various intuitive human-machine interfaces (HMIs) for a user to interact with a wearable device. A surface associated with a user, a hand of the user and/or the content or text in a window/area around a fingertip of the user may be used as ways for the user to enter user inputs, e.g., commands, for the wearable device to carry out various actions and/or launch various applications. Accordingly, the aforementioned problem associated with the small touch screen of a wearable device is at least addressed, alleviated or otherwise minimized.

In one example implementation, a method may involve a wearable device transmitting mechanical waves or electromagnetic waves toward a surface. The method may also involve the wearable device receiving a reflected portion of the mechanical waves or electromagnetic waves. The method may further involve the wearable device analyzing the reflected portion of the mechanical waves or electromagnetic waves to determine a user input. The method may additionally involve the wearable device performing one or more operations on the wearable device responsive to a result of the analyzing.

In another example implementation, a method may involve a wearable device receiving a visual image of at least a part of a hand wearing the wearable device. The method may also involve the wearable device analyzing the visual image to determine a user input. The method may further involve the wearable device performing one or more operations on the wearable device responsive to the user input.

In a further example implementation, an apparatus may include one or more operational components, a memory, a processor and a casing. The one or more operational components may be configured to sense a user input related to at least one or more movements, one or more touches, one or more gestures, one or more poses or an area pointed by a hand. The memory may be configured to store a plurality of processor-executable sets of instructions corresponding to a plurality of applications. The processor may be communicatively coupled to the one or more operational components and the memory. The processor may be configured to analyze the user input and perform one or more operations responsive to the user input. The casing may contain the one or more operational components, the memory and the processor therein. The casing may be configured to attach to the user. Alternatively, the apparatus may include an appendage mechanism coupled to the casing and configured to attach to the user.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Implementations in accordance with the present disclosure relate to various techniques, methods and/or schemes with respect to interacting with a wearable device which is worn by or otherwise attached to a user. The wearable device may be, for example and not limited to, a smartphone, smartwatch, smart bracelet, smart wristband, smart necklace or the like. In some implementations, a surface associated with a hand may be utilized to serve as an extended touch pad under a multi-touch scheme in accordance with the present disclosure. In some implementations, fingertip(s) of a hand of the user may be utilized to serve as an indicator of what action(s) to take and/or what application(s) to launch under a hand-pose scheme in accordance with the present disclosure.

Figure 1:
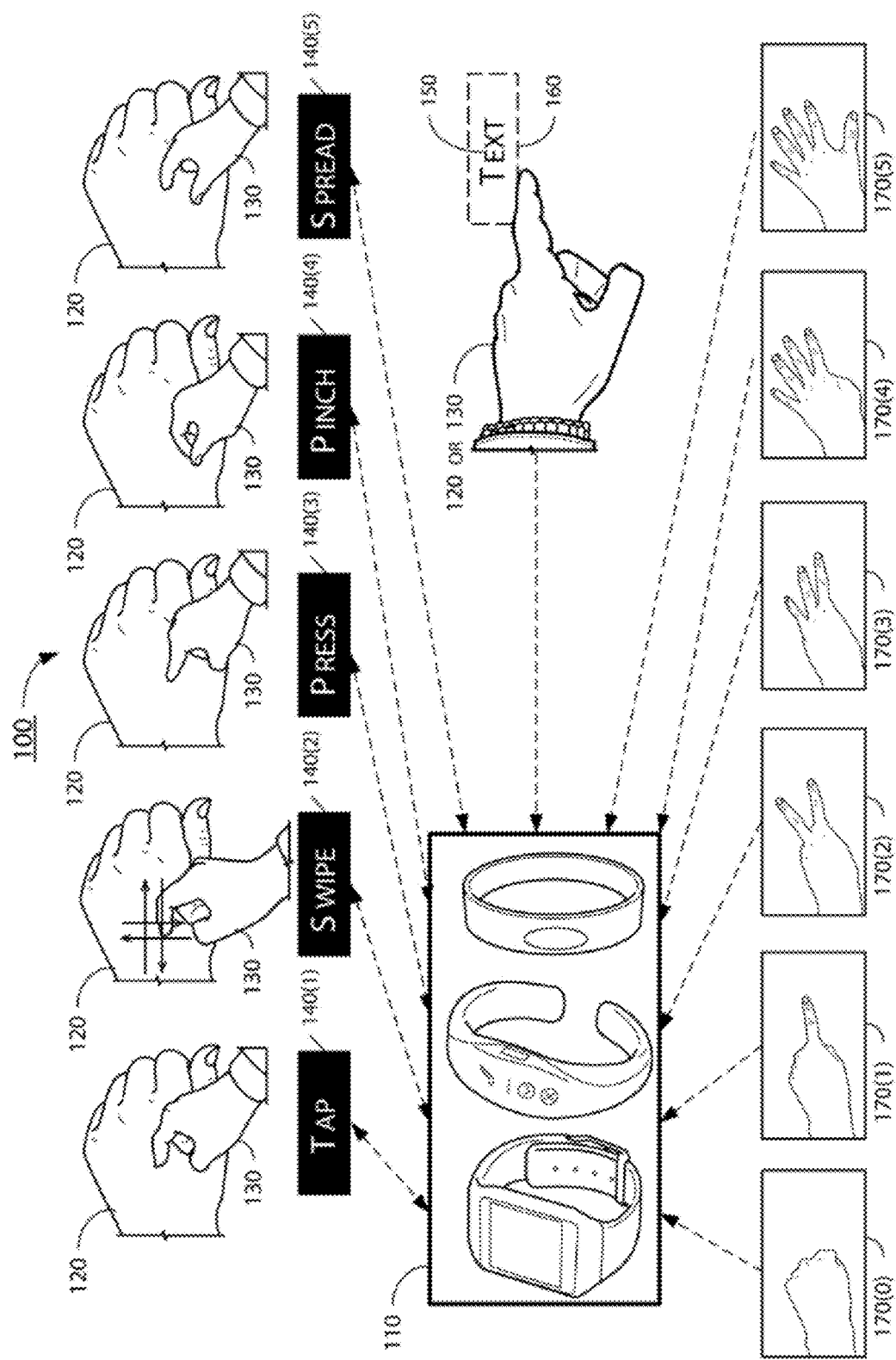
FIG. 1 is a diagram of an overview of various example implementations in accordance with the present disclosure.

FIG. 1 illustrates an overview 100 of various example implementations in accordance with the present disclosure. In overview 100, an apparatus 110, which may be a wearable device, is configured to perform various functions described herein and any variations and derivatives thereof. Apparatus 110 may be, for example and not limited to, a smartwatch, smart bracelet, smart wristband, smart necklace or the like. In the example shown in FIG. 1, images of a smartwatch, a smart bracelet and a smart wristband are shown as an indication that apparatus 110 may be any type of wearable device conceivable. Apparatus 110 may be configured to operate in one or more modes. For example without limiting the scope of the present disclosure, apparatus 110 may operate in either or both of a multi-touch mode and a hand-pose mode.

In the multi-touch mode, apparatus 110 may detect, perceive or otherwise recognize a user input in the form of one of multiple possible movements, touches and/or gestures 140(1)-140(N), where N is a positive integer greater than 1. In the example shown in FIG. 1, apparatus 110 is worn on an arm associated with a first hand 120 of the user. The user input, as one of movements, touches and/or gestures 140(1)-140(N), may include, for example and not limited to, one, some or all of a tap 140(1) by a second hand 130 of the user, a swipe 140(2) by second hand 130, a press 140(3) by second hand 130, a pinching motion 140(4) by second hand 130, and a spreading motion 140(5) by second hand 130. Based on the user input, apparatus 110 may correspondingly take one or more actions and/or launch one or more applications.

In the hand-pose mode, apparatus 110 may detect, perceive or otherwise recognize a user input in the form of one of multiple possible gestures and/or poses 170(0)-170(M), wherein M is a positive integer greater than 1, by a hand (e.g., first hand 120 or second hand 130) of the user. Alternatively or additionally, in the hand-pose mode, apparatus 110 may detect, perceive or otherwise recognize a user input in the form of an area or window pointed by a hand (e.g., first hand 120 or second hand 130) of the user. In some implementations, apparatus 110 may be worn on first hand 120 and detect various hand poses made by second hand 130 as user input. Alternatively or additionally, apparatus 110 may be worn on first hand 120 and detect various hand poses made by first hand 120 as user input. Alternatively or additionally, apparatus 110 may be worn on first hand 120 and detect various hand poses made by both first hand 120 and second hand 130 as user input. That is, the user may use a single hand (e.g., the hand associated with the arm on which apparatus 110 is worn or the other hand) or both hands to provide user input to apparatus 110 in the form of one or more hand poses.

In the example shown in FIG. 1, apparatus 110 may determine, recognize or otherwise count a number of fingers extended by a hand of the user such as, for example, zero finger extended in hand pose 170(0), one finger extended in hand pose 170(1), two fingers extended in hand pose 170(2), three fingers extended in hand pose 170(3), four fingers extended in hand pose 170(4) or five fingers extended in hand pose 170(5). Based on the hand pose recognized or the number of extended fingers counted, apparatus 110 may correspondingly take one or more actions and/or launch one or more applications. Also in the example shown in FIG. 1, apparatus 110 may detect, perceive or otherwise recognize a text 150 within an area or window 160 pointed by a finger of a hand (e.g., first hand 120 or second hand 130). In some implementations, the text alone may be a user input based on which apparatus 110 may correspondingly take one or more actions and/or launch one or more applications. In some implementations, the text in combination with additional information, such as the location of apparatus 110 (and the user) for example, may be used by apparatus 110 to determine a context based on which apparatus 110 may correspondingly take one or more actions and/or launch one or more applications.

Figure 2:
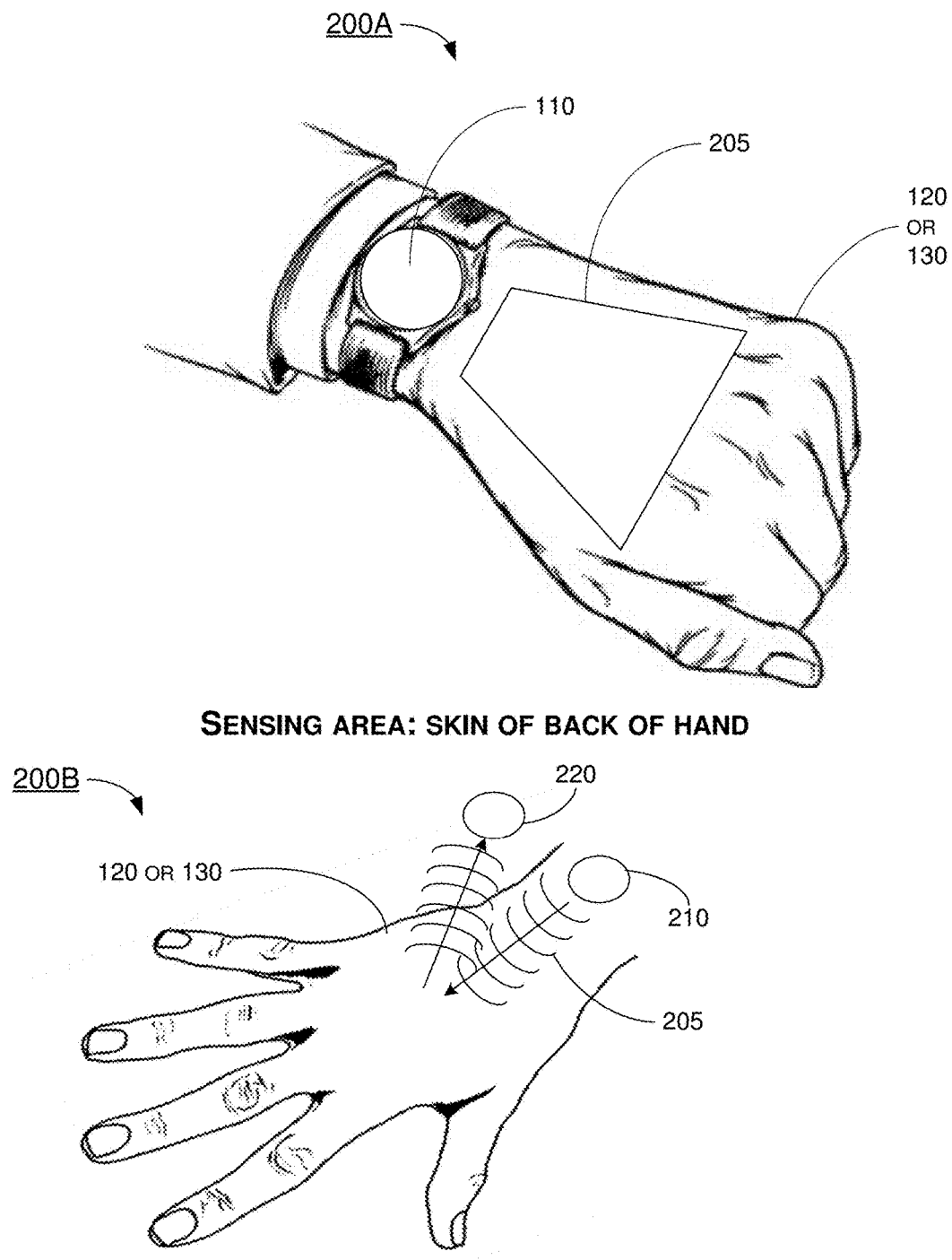
FIG. 2 is a diagram of example scenarios in accordance with an implementation of the present disclosure.

FIG. 2 illustrates example scenarios 200A and 200B in accordance with an implementation of the present disclosure. As shown in scenario 200A, apparatus 110 may transmit mechanical waves or electromagnetic waves toward a sensing area 205 on a surface associated with a user who is wearing apparatus 110. The surface may be, for example and not limited to, the skin of the back of a hand (e.g., first hand 120 or second hand 130) of the user, the skin of the palm of a hand (e.g., first hand 120 or second hand 130) of the user, the skin of any other portion of a hand (e.g., first hand 120 or second hand 130) of the user, a surface of a glove worn on a hand (e.g., first hand 120 or second hand 130) of the user or a surface of a clothing or apparel worn by the user. The mechanical waves or electromagnetic waves may be, for example and not limited to, an optical signal or acoustic signal. Apparatus 110 may receive at least a reflected portion of the mechanical waves or electromagnetic waves and analyze the reflected portion of the mechanical waves or electromagnetic waves to determine a user input from the user. Correspondingly, apparatus 110 may performing one or more operations, such as taking one or more actions and/or launching one or more applications, in response to a result of the analyzing. In the example shown in scenario 200A, a sensing area may be the skin of the back of first hand 120.

As shown in scenario 200B, apparatus 110 may include a mechanical wave or electromagnetic wave transmitter 210 and a mechanical wave or electromagnetic wave receiver 220 such that mechanical wave or electromagnetic wave transmitter 210 may transmit mechanical waves or electromagnetic waves toward the sensing area, such as the skin of the back of first hand 120 or second hand 130, and mechanical wave or electromagnetic wave receiver 220 may receive at least a reflected portion of the mechanical waves or electromagnetic waves.

Figure 3:
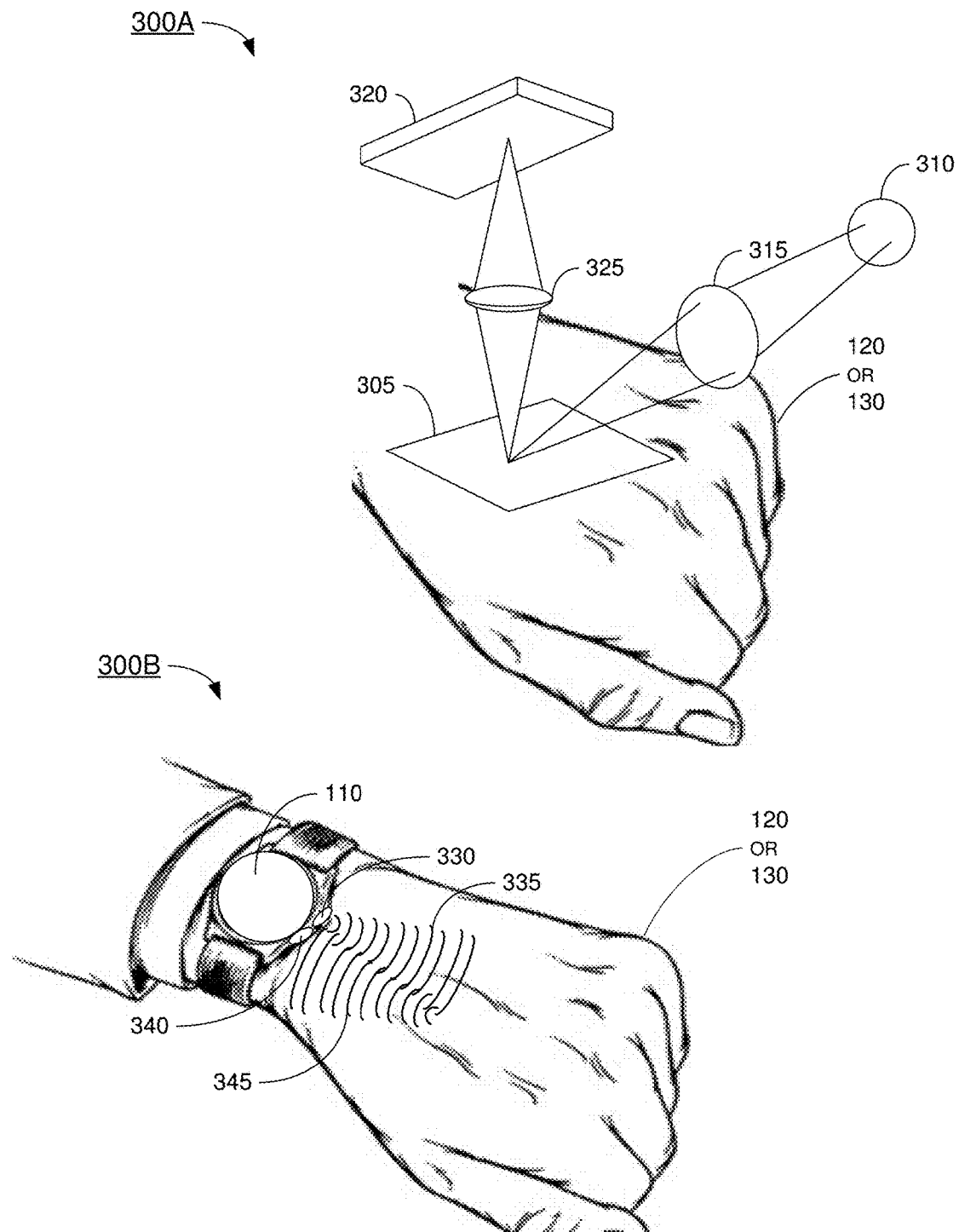
FIG. 3 is a diagram of example scenarios in accordance with an implementation of the present disclosure.

FIG. 3 illustrates example scenarios 300A and 300B in accordance with an implementation of the present disclosure. Both scenarios 300A and 300B illustrate how mechanical waves or electromagnetic waves may be utilized for interactions between a user and a wearable device such as apparatus 110. In scenario 300A, an optical signal transmitter 310 may transmit an optical signal through a first optical component 315 (e.g., collimator and/or lens) onto a sensing area 305, which may be a surface on the back of a hand (e.g., hand 120 or 130) for example. At least a portion of the optical signal is reflected by sensing area 305 and received by an optical signal receiver 320 through a second optical component 325 (e.g., collimator and/or lens). Optical signal transmitter 310, optical signal receiver 320, first optical component 315 and second optical component 325 may be part of a wearable device (e.g., apparatus 110). In some implementations, optical signal transmitter 310 may include one or more infrared light-emitting diodes (IR LEDs). Alternatively or additionally, optical signal transmitter 310 may include one or more visible blue LEDs. In some implementations, optical signal receiver 320 may include one or more photodetectors. In the case that optical signal receiver 320 includes multiple photodetectors, the photodetectors may be arranged in an array or one or more lines. In some other embodiments, the positions of optical signal transmitter 310, first optical component 315, optical signal receiver 320, and second optical component 325 may be adjusted, which should not be limited in this disclosure.

In scenario 300B, an acoustic signal transmitter 330 may transmit an acoustic signal onto a sensing area a surface, such as the back of a hand (e.g., first hand 120 or second hand 130) for example. At least a portion of the acoustic signal is reflected by the sensing area and received by an acoustic signal receiver 340. Acoustic signal transmitter 330 and acoustic signal receiver 340 may be part of a wearable device (e.g., apparatus 110). In some implementations, acoustic signal transmitter 330 may include one or more ultrasonic speakers. In some implementations, acoustic signal receiver 340 may include one or more microphones.

Figure 4:
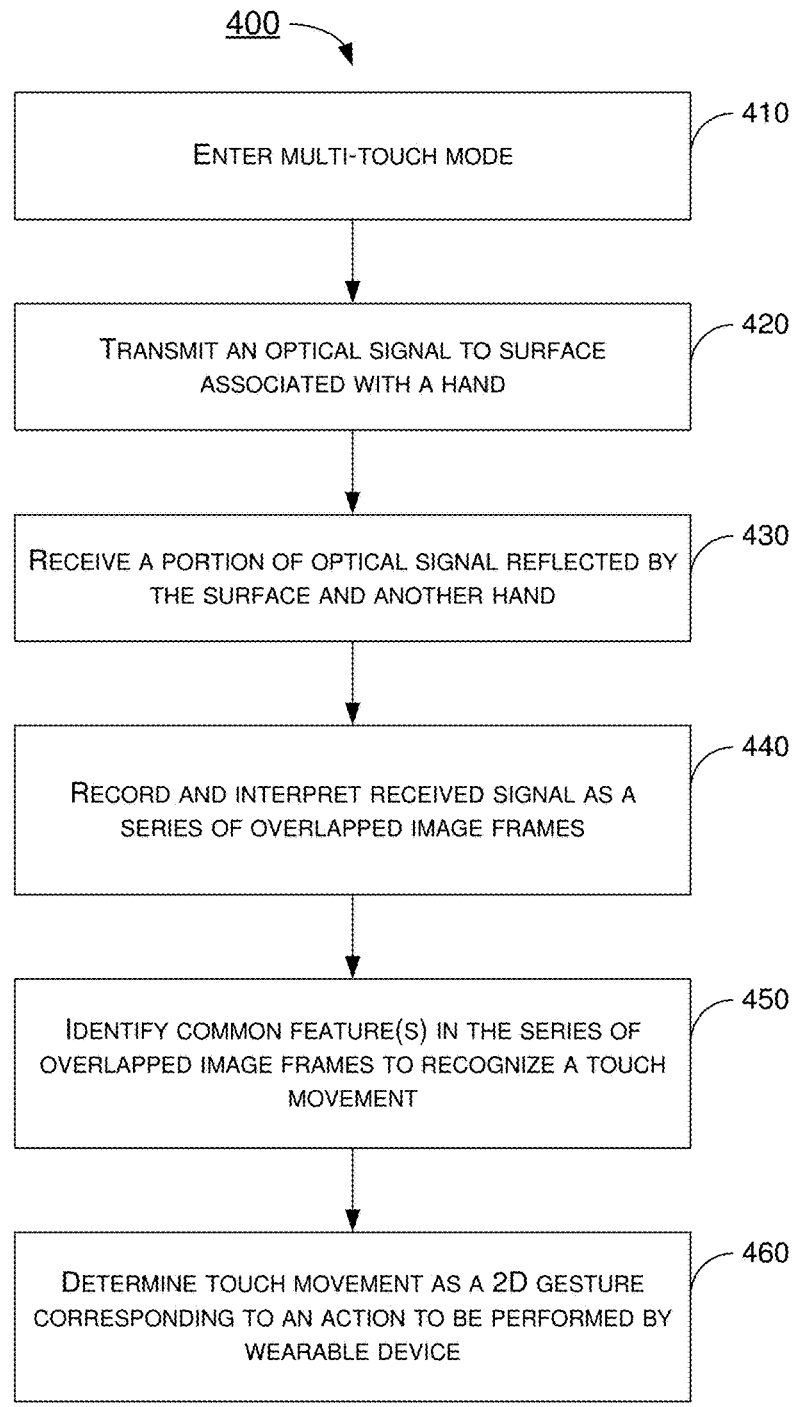
FIG. 4 is a diagram of an example algorithm in accordance with an implementation of the present disclosure.

FIG. 4 illustrates an example algorithm 400 in accordance with an implementation of the present disclosure. Algorithm 400 may include one or more operations, actions, or functions as represented by one or more blocks such as blocks 410, 420, 430, 440, 450 and 460. Although illustrated as discrete blocks, various blocks of algorithm 400 may be divided into additional blocks, combined into fewer blocks, or eliminated, depending on the desired implementation. The blocks of algorithm 400 may be performed in the order shown in FIG. 4 or in any other order, depending on the desired implementation. Algorithm 400 may be implemented by apparatus 110. For illustrative purpose without limiting the scope of the present disclosure, the following description of algorithm 400 is provided in the context of apparatus 110 although algorithm 400 may be implemented by wearable devices other than apparatus 110. Algorithm 400 may start at 410.

At 410, apparatus 110 may enter a multi-touch mode. Algorithm 400 may proceed from 410 to 420.

At 420, apparatus 110 may transmit an optical signal to a surface associated with a hand. For instance, apparatus 110 may utilize optical signal transmitter 310, which may include one or more IR LEDs and/or one or more visible blue LEDs for example, to transmit an optical signal to the skin of the back of a hand (e.g., first hand 120) of a user, the skin of the palm of a hand (e.g., first hand 120 or second hand 130) of the user, the skin of any other portion of a hand (e.g., first hand 120 or second hand 130) of the user, a surface of a glove worn on a hand (e.g., first hand 120) of the user or a surface of a clothing or apparel worn by the user. Algorithm 400 may proceed from 420 to 430.

At 430, apparatus 110 may receive a portion of the optical signal reflected by the surface and another hand (e.g., second hand 130) of the user. For instance, apparatus 110 may utilize optical signal receiver 320, which may include one or more photodetectors for example, to receive a reflected portion of the optical signal. Algorithm 400 may proceed from 430 to 440.

At 440, apparatus 110 may record and interpret the received signal as a series of image frames, which may be at least partially overlapped or have at least one portion in common. The frame rate may be appropriate (e.g., high enough) so that sequential image frames may be overlapped or have at least one portion in common. That is, a given image frame may overlap or have at least one portion in common with a portion of a prior image frame as well as overlap or have at least one portion in common with a portion of a subsequent image frame. This allows commonality and differences between adjacent image frames to be detected, discerned or otherwise recognized. Algorithm 400 may proceed from 440 to 450.

At 450, apparatus 110 may identify one or more common features in the series of overlapped image frames to recognize one or more touch movements (e.g., by the another hand of the user). Algorithm 400 may proceed from 450 to 460.

At 460, apparatus 110 may determine the touch movement by the user as, for example, a 2D gesture that corresponds to an action to be performed by apparatus 110 (e.g., launching a corresponding application). The gesture may be, for example, one of the gestures 140(1)-140(N) such as a tap 140(1) by a second hand 130 of the user, a swipe 140(2) by second hand 130, a press 140(3) by second hand 130, a pinching motion 140(4) by second hand 130, and a spreading motion 140(5) by second hand 130. Accordingly, the interaction is intuitive and similar to the usage of mobile phones.

Figure 5:
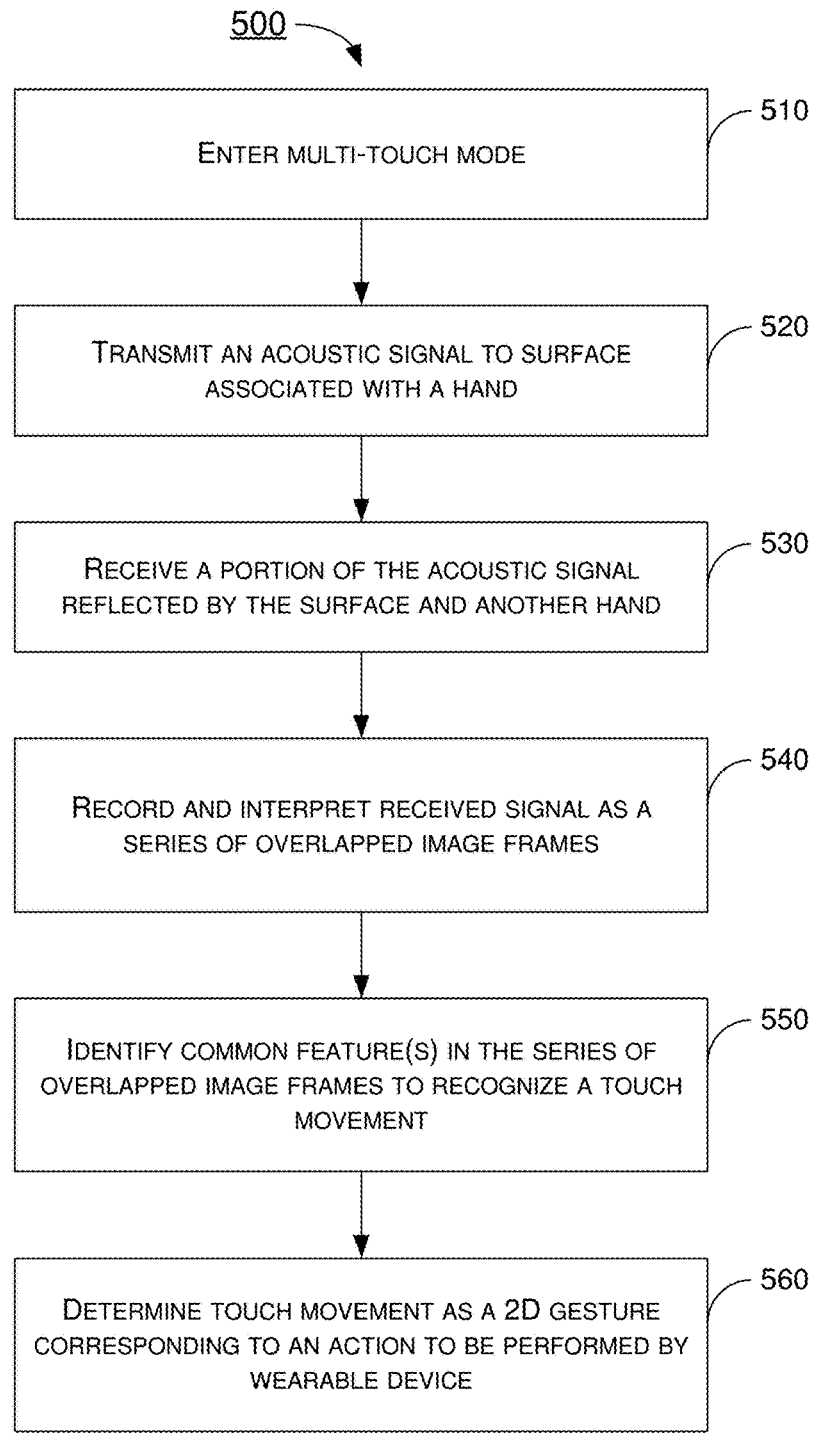
FIG. 5 is a diagram of an example algorithm in accordance with an implementation of the present disclosure.

FIG. 5 illustrates an example algorithm 500 in accordance with an implementation of the present disclosure. Algorithm 500 may include one or more operations, actions, or functions as represented by one or more blocks such as blocks 510, 520, 530, 540, 550 and 560. Although illustrated as discrete blocks, various blocks of algorithm 500 may be divided into additional blocks, combined into fewer blocks, or eliminated, depending on the desired implementation. The blocks of algorithm 500 may be performed in the order shown in FIG. 5 or in any other order, depending on the desired implementation. Algorithm 500 may be implemented by apparatus 110. For illustrative purpose without limiting the scope of the present disclosure, the following description of algorithm 500 is provided in the context of apparatus 110 although algorithm 500 may be implemented by wearable devices other than apparatus 110. Algorithm 500 may start at 510.

At 510, apparatus 110 may enter a multi-touch mode. Algorithm 500 may proceed from 510 to 520.

At 520, apparatus 110 may transmit an acoustic signal to a surface associated with a hand. For instance, apparatus 110 may utilize acoustic signal transmitter 330, which may include one or more ultrasonic speakers for example, to transmit an acoustic signal to the skin of the back of a hand (e.g., first hand 120) of a user, the skin of the palm of a hand (e.g., first hand 120 or second hand 130) of the user, the skin of any other portion of a hand (e.g., first hand 120 or second hand 130) of the user, a surface of a glove worn on a hand (e.g., first hand 120) of the user or a surface of a clothing or apparel worn by the user. Algorithm 500 may proceed from 520 to 530.

At 530, apparatus 110 may receive a portion of the acoustic signal reflected by the surface and another hand (e.g., second hand 130) of the user. For instance, apparatus 110 may utilize acoustic signal receiver 340, which may include one or more microphones for example, to receive a reflected portion of the acoustic signal. Algorithm 500 may proceed from 530 to 540.

At 540, apparatus 110 may record and interpret the received signal as a series of image frames, which are at least partially overlapped or have at least one portion in common. The frame rate may be appropriate (e.g., high enough) so that sequential image frames may be overlapped or have at least one portion in common. That is, a given image frame may overlap or have at least one common portion with a portion of a prior image frame as well as overlap or have at least one common portion with a portion of a subsequent image frame. This allows commonality and differences between adjacent image frames to be detected, discerned or otherwise recognized. Algorithm 500 may proceed from 540 to 550.

At 550, apparatus 110 may identify one or more common features in the series of image frames, which may be at least partially overlapped or have at least one portion in common, to recognize one or more tough movements (e.g., by the another hand of the user). Algorithm 500 may proceed from 550 to 560.

At 560, apparatus 110 may determine the touch movement by the user as a gesture that corresponds to an action to be performed by apparatus 110 (e.g., launching a corresponding application). The gesture may be, for example and not limited to, a two-dimensional (2D) gesture (e.g., horizontal movement(s) and/or vertical movement(s))

Figure 6:
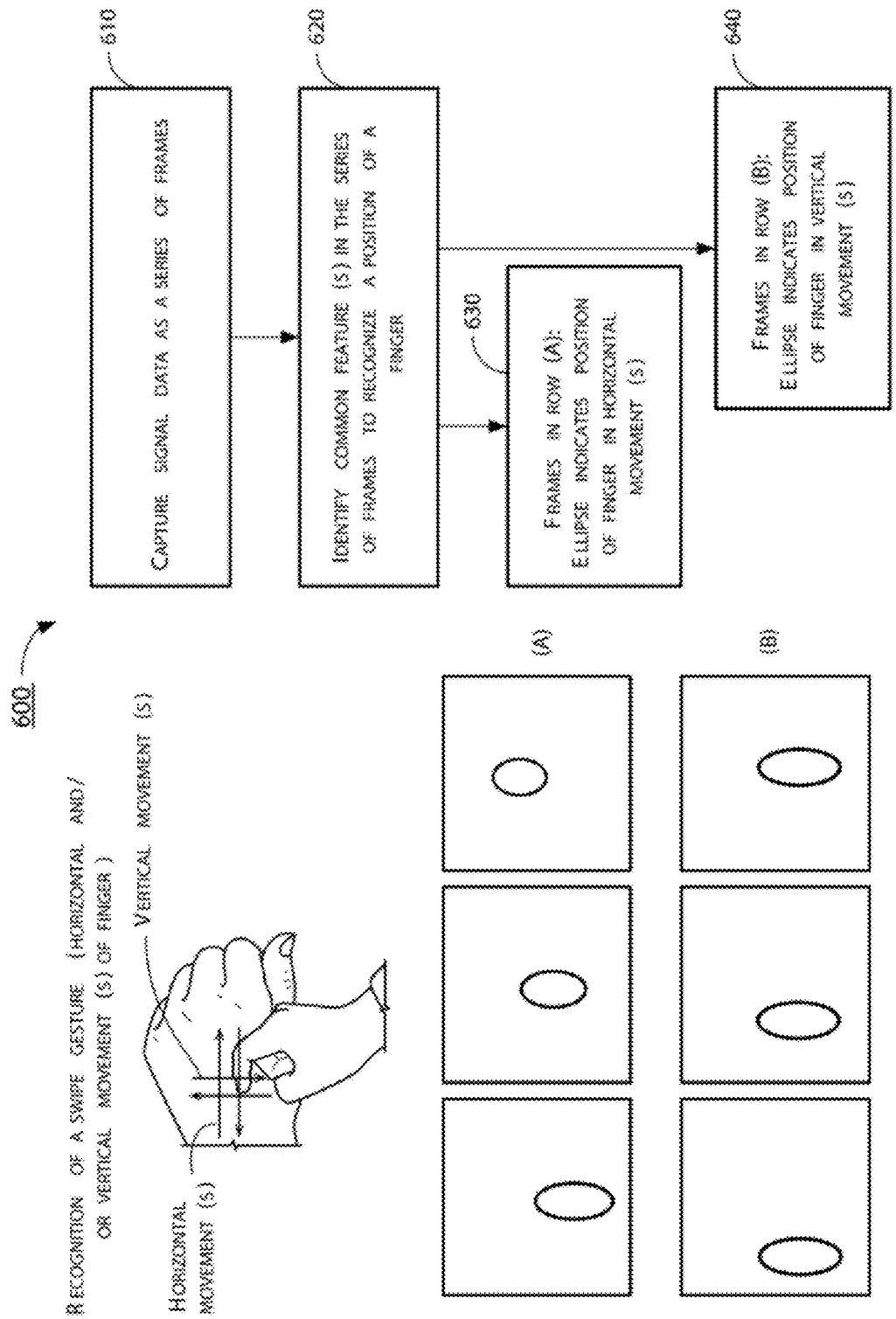
FIG. 6 is a diagram of an example scenario in accordance with an implementation of the present disclosure.

FIG. 6 illustrates an example scenario 600 in accordance with an implementation of the present disclosure. Scenario 600 may depict implementations of algorithm 500. For illustrative purpose without limiting the scope of the present disclosure, the following description of scenario 600 is provided in the context of apparatus 110 although scenario 600 may be implemented by wearable devices other than apparatus 110. Scenario 600 may include a number of stages such as stages 610, 620, 630 and 640. Scenario 600 may start at 610.

At 610, apparatus 110 may capture signal data (e.g., reflected portion of acoustic signal) which may be interpreted as a series of overlapped image frames. For illustrative purpose with limiting the scope of the present disclosure, the series of overlapped image frames may include a row of frames such as those in row (A) or row (B) as shown in FIG. 6. Scenario 600 may proceed from 610 to 620.

At 620, apparatus 110 may identify one or more common features in the series of image frames to recognize a position and/or movement of a finger or fingertip of a user. Scenario 600 may proceed from 620 to either 630 or 640.

At 630, an ellipse in the series of image frames in row (A) may indicate a respective position of the finger or fingertip as the finger is in a horizontal movement. In other words, the ellipse in the series of image frames in row (A) may be taken as the recognized finger or fingertip. In some implementations, a degree of darkness of a color of the image of the ellipse may indicate a strength of the detected signal. For example, the darker the color of the image of the ellipse the stronger the detected signal may be, and vice versa.

At 640, an ellipse in the overlapped image frames in row (B) may indicate a respective position of the finger or fingertip as the finger is in a vertical movement. In other words, the ellipse in the series of image frames in row (B) may be taken as the recognized finger or fingertip. In some implementations, a degree of darkness of a color of the image of the ellipse may indicate a strength of the detected signal. For example, the darker the color of the image of the ellipse the stronger the detected signal may be, and vice versa.

Figure 7:
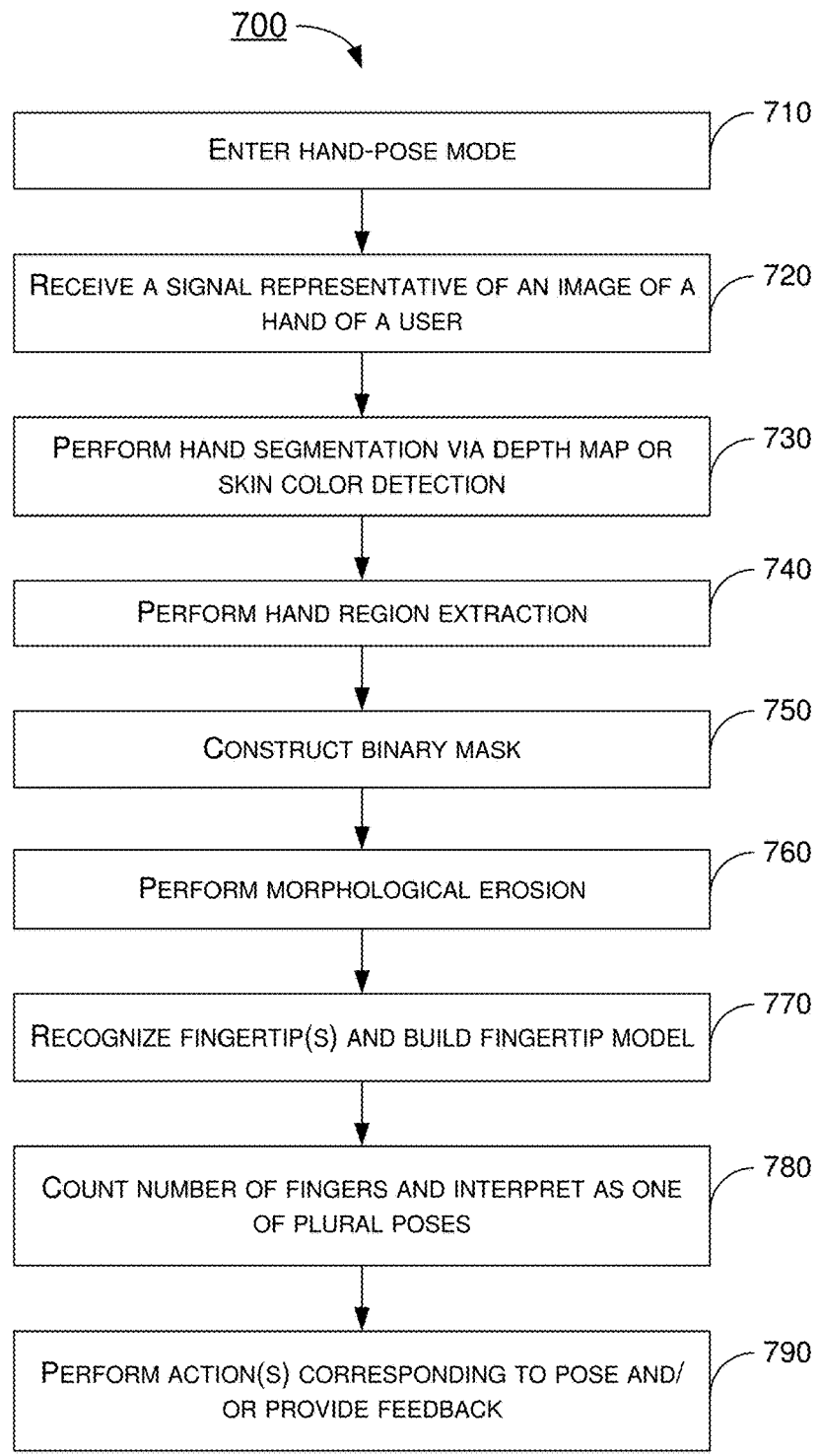
FIG. 7 is a diagram of an example algorithm in accordance with an implementation of the present disclosure.

FIG. 7 illustrates an example algorithm 700 in accordance with an implementation of the present disclosure. Algorithm 700 may include one or more operations, actions, or functions as represented by one or more blocks such as blocks 710, 720, 730, 740, 750, 760, 770, 780 and 790. Although illustrated as discrete blocks, various blocks of algorithm 700 may be divided into additional blocks, combined into fewer blocks, or eliminated, depending on the desired implementation. The blocks of algorithm 700 may be performed in the order shown in FIG. 7 or in any other order, depending on the desired implementation. Algorithm 700 may be implemented by apparatus 110 with respect to a first hand-pose mode. For illustrative purpose without limiting the scope of the present disclosure, the following description of algorithm 700 is provided in the context of apparatus 110 although algorithm 700 may be implemented by wearable devices other than apparatus 110. Algorithm 700 may start at 710.

At 710, apparatus 110 may enter a hand-pose mode. Algorithm 700 may proceed from 710 to 720.

At 720, apparatus 110 may receive a signal representative of an image of a hand (e.g., first hand 120 or second hand 130) of a user. The signal may contain data representative of, for example and not limited to, a visual image, a depth map or a result of skin color detection. For example, the user may wear apparatus 110, as a smartwatch, smart bracelet or smart wristband for example, on first hand 120 and perform various hand poses using first hand 120 as user inputs to interact with apparatus 110. As another example, the user may wear apparatus 110 on first hand 120 and perform various hand poses using second hand 130 as user inputs to interact with apparatus 110. Algorithm 700 may proceed from 720 to 730.

At 730, apparatus 110 may perform segmentation of the image of the hand, e.g., via a visual image, a depth map or skin color detection. Algorithm 700 may proceed from 730 to 740.

At 740, apparatus may perform hand recognition extraction to recognize the hand (e.g., first hand 120 or second hand 130) of the user as represented by the data in the received signal. Algorithm 700 may proceed from 740 to 750.

At 750, apparatus 110 may construct a binary mask. Algorithm 700 may proceed from 750 to 760.

At 760, apparatus 110 may perform morphological erosion. Algorithm 700 may proceed from 760 to 770.

At 770, apparatus 110 may recognize one or more fingertips and/or fingers in the image of the hand of the user and build a fingertip model. Algorithm 700 may proceed from 770 to 780.

At 780, apparatus 110 may count the number of fingers extended by the hand of the user in the image, and interpret the counted number of extended finger(s) as one of multiple predefined hand poses corresponding to multiple predefined commands. Thus, the finger count may correspond to a predefined hand pose which may correspond to a predefined user input and/or command. Algorithm 700 may proceed from 780 to 790.

At 790, apparatus 110 may take appropriate action(s) corresponding to the user input and/or command. For instance, as the finger count may correspond to a particular user input associated with a respective command, apparatus 110 may perform one or more actions, launch one or more applications corresponding to the user input and/or command and/or provide feedback to the user.

Figure 8:
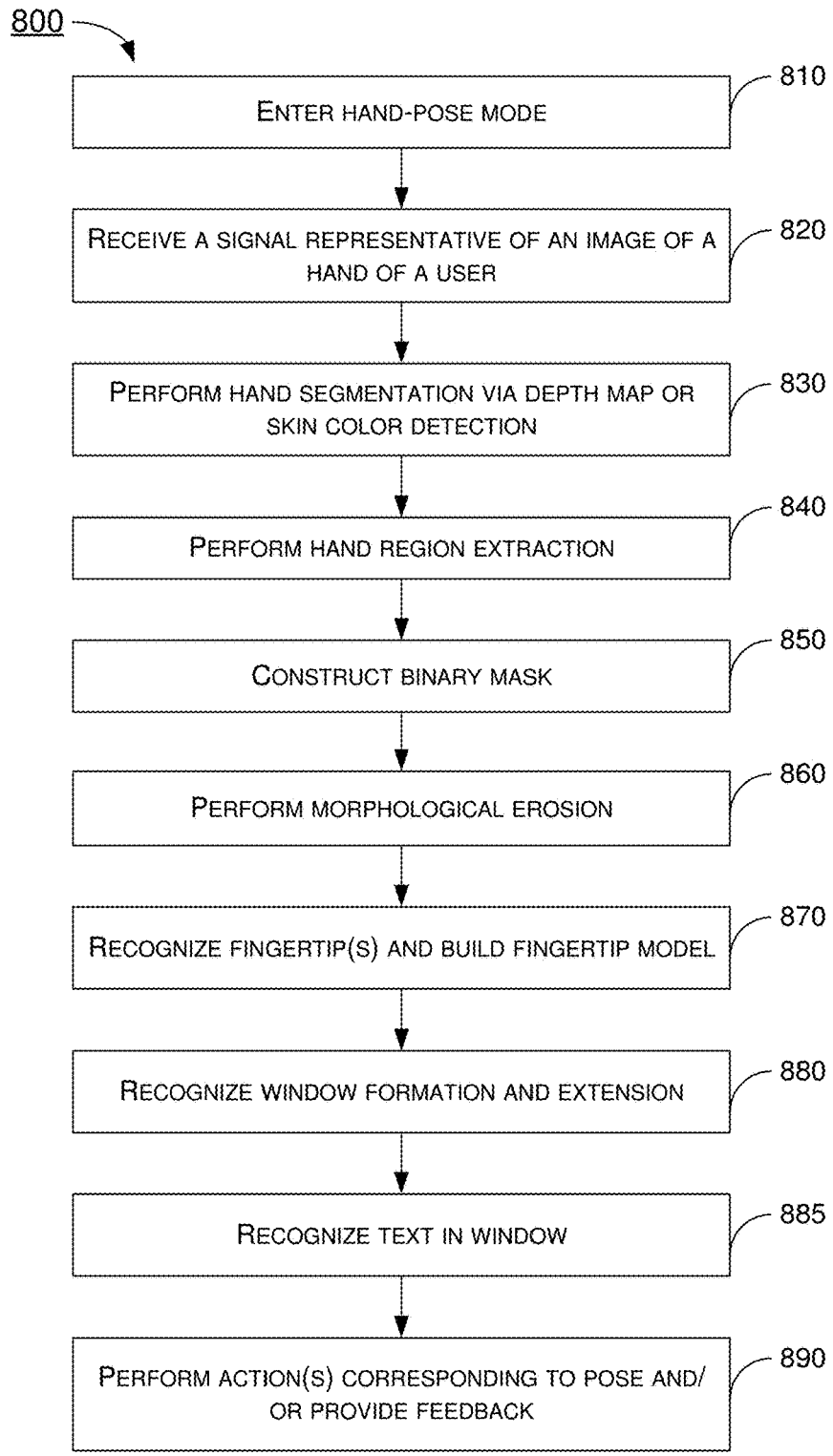
FIG. 8 is a diagram of an example algorithm in accordance with an implementation of the present disclosure.

FIG. 8 illustrates an example algorithm 800 in accordance with an implementation of the present disclosure. Algorithm 800 may include one or more operations, actions, or functions as represented by one or more blocks such as blocks 810, 820, 830, 840, 850, 860, 870, 880, 885 and 890. Although illustrated as discrete blocks, various blocks of algorithm 800 may be divided into additional blocks, combined into fewer blocks, or eliminated, depending on the desired implementation. The blocks of algorithm 800 may be performed in the order shown in FIG. 8 or in any other order, depending on the desired implementation. Algorithm 800 may be implemented by apparatus 110 with respect to a second hand-pose mode different from that represented by algorithm 700. The second hand-pose mode may be a point out mode or any other mode different from that represented by algorithm 700. For illustrative purpose without limiting the scope of the present disclosure, the following description of algorithm 800 is provided in the context of apparatus 110 although algorithm 800 may be implemented by wearable devices other than apparatus 110. Algorithm 800 may start at 810.

At 810, apparatus 110 may enter a hand-pose mode. Algorithm 800 may proceed from 810 to 820.

At 820, apparatus 110 may receive a signal representative of an image of a hand (e.g., first hand 120 or second hand 130) of a user. The signal may contain data representative of, for example and not limited to, a visual image, a depth map or a result of skin color detection. For example, the user may wear apparatus 110, as a smartwatch, smart bracelet or smart wristband for example, on first hand 120 and perform various hand poses using first hand 120 as user inputs to interact with apparatus 110. As another example, the user may wear apparatus 110 on first hand 120 and perform various hand poses using second hand 130 as user inputs to interact with apparatus 110. Algorithm 800 may proceed from 820 to 830.

At 830, apparatus 110 may perform segmentation of the image of the hand, e.g., via a visual image, a depth map or skin color detection. Algorithm 800 may proceed from 830 to 840.

At 840, apparatus may perform hand recognition extraction to recognize the hand (e.g., first hand 120 or second hand 130) of the user as represented by the data in the received signal. Algorithm 800 may proceed from 840 to 850.

At 850, apparatus 110 may construct a binary mask. Algorithm 800 may proceed from 850 to 860.

At 860, apparatus 110 may perform morphological erosion. Algorithm 800 may proceed from 860 to 870.

At 870, apparatus 110 may recognize one or more fingertips and/or fingers in the image of the hand of the user and build a fingertip model. Algorithm 800 may proceed from 870 to 880.

At 880, apparatus 110 may recognize, identify, form or otherwise define an area or window around the fingertip of a finger extended by the hand of the user in the image. For instance, apparatus 110 may automatically spread out a recognition window or a defined area around the identified fingertip in a fixed are, so that a text in the window or area may be recognized by apparatus 110. Algorithm 800 may proceed from 880 to 885.

At 885, apparatus 110 may identify, perceive or otherwise recognize a text within the defined area or window around the fingertip. Algorithm 800 may proceed from 885 to 890. In some other embodiments, apparatus 110 may identify, perceive or otherwise recognize an object within the defined area or window around the fingertip, and provide related information, which should not be limited in this disclosure.

At 890, apparatus 110 may take appropriate action(s) corresponding to the user input and/or command. For instance, as the text may correspond to a particular user input associated with a respective command, apparatus 110 may perform one or more actions, launch one or more applications corresponding to the user input and/or command and/or provide feedback to the user.

Figure 9:
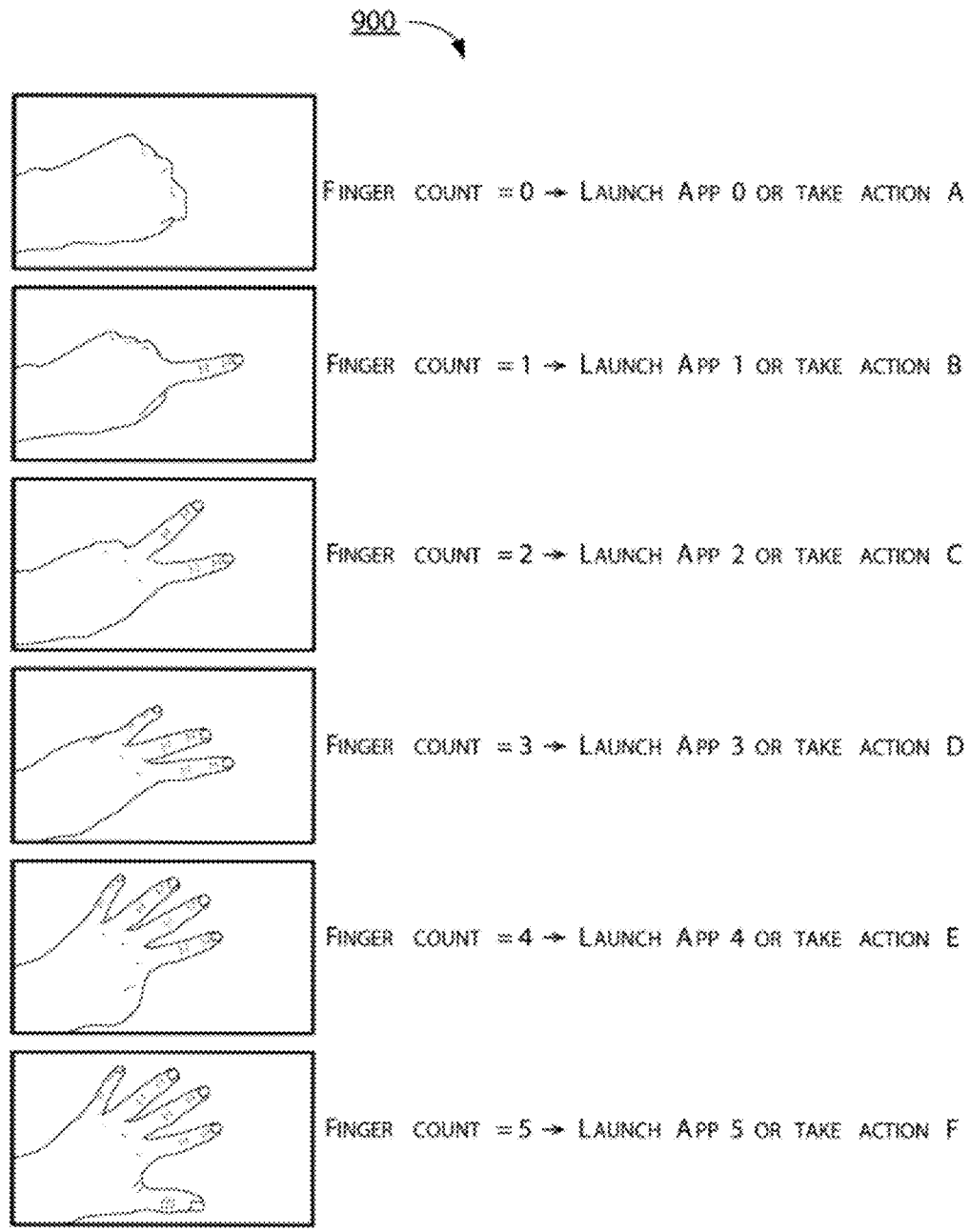
FIG. 9 is a diagram of an example scenario in accordance with an implementation of the present disclosure.

FIG. 9 illustrates an example scenario 900 in accordance with an implementation of the present disclosure. It is noteworthy that the example shown in FIG. 9 is for illustrative purpose without limiting the scope of the present disclosure. Scenario 900 may depict an example implementation of algorithm 700. In the example shown in FIG. 9, a count of no finger extending from the hand of the user (i.e., finger count=0) may corresponding to a specific user input that corresponds to a command such as, for example, launching application 0 or take action A. A count of one finger extending from the hand of the user (i.e., finger count=1) may corresponding to a specific user input that corresponds to a command such as, for example, launching application 1 or take action B. A count of two fingers extending from the hand of the user (i.e., finger count=2) may corresponding to a specific user input that corresponds to a command such as, for example, launching application 2 or take action C. A count of three fingers extending from the hand of the user (i.e., finger count=3) may corresponding to a specific user input that corresponds to a command such as, for example, launching application 3 or take action D. A count of four fingers extending from the hand of the user (i.e., finger count=4) may corresponding to a specific user input that corresponds to a command such as, for example, launching application 4 or take action E. A count of five fingers extending from the hand of the user (i.e., finger count=5) may corresponding to a specific user input that corresponds to a command such as, for example, launching application 5 or take action F.

Figures 10A, 10B:
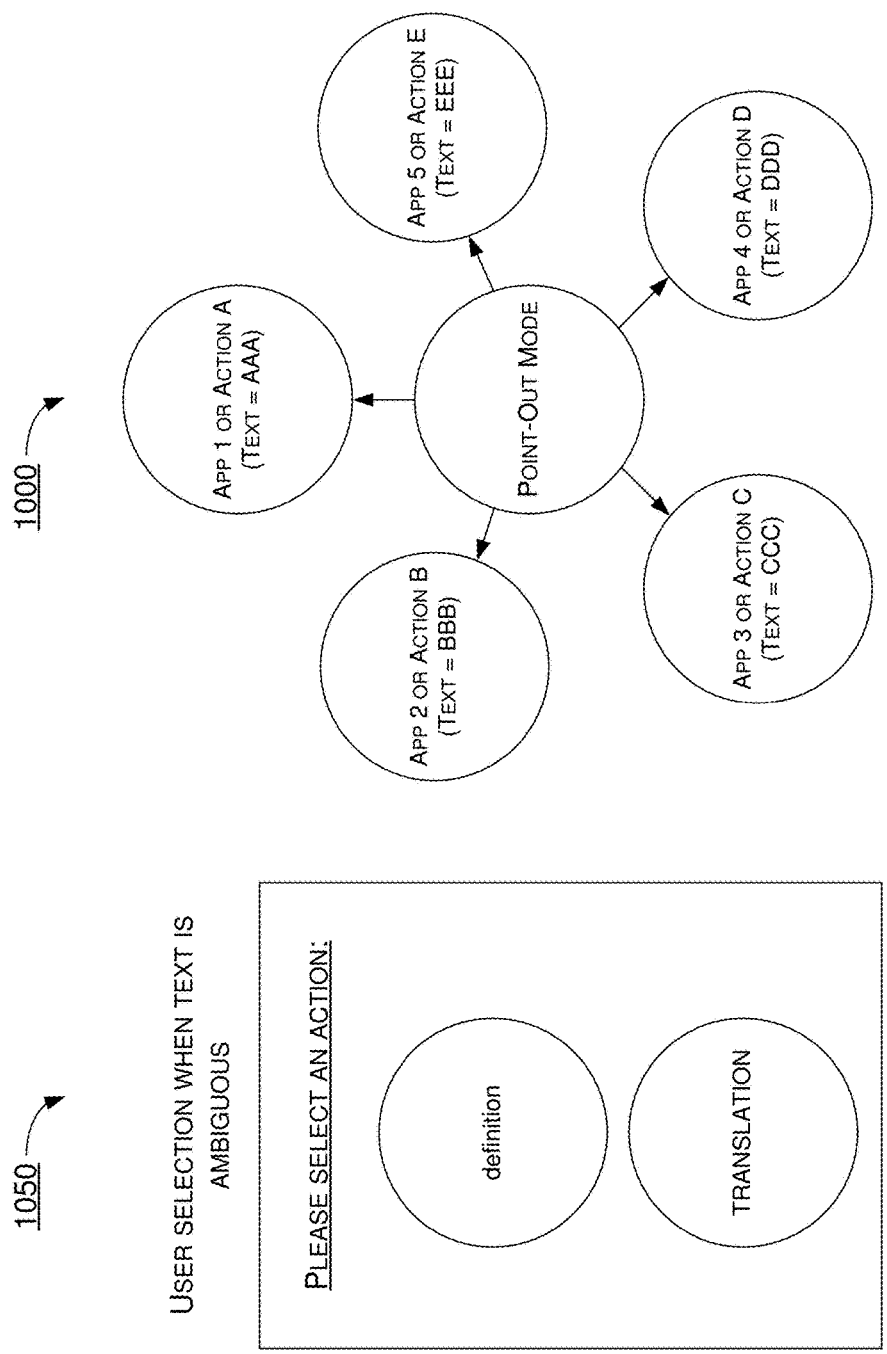
FIG. 10A is a diagram of an example scenario in accordance with an implementation of the present disclosure.
FIG. 10B is a diagram of an example scenario in accordance with an implementation of the present disclosure.

FIG. 10A illustrates an example scenario 1000 in accordance with an implementation of the present disclosure. FIG. 10B illustrates an example scenario 1050 in accordance with an implementation of the present disclosure. It is noteworthy that the example shown in each of FIG. 10A and FIG. 10B is for illustrative purpose without limiting the scope of the present disclosure. Scenario 1000 may depict an example implementation of algorithm 800. In the example shown in FIG. 10, in a "point-out" mode, user input is based on the a text being pointed by a finger of the user. In the point-out mode, a recognition window may be automatically spread out in a fixed area around the identified fingertip of a finger of the user, and text within the recognition window may be recognized as use input. In the point-out mode, one or more appropriate actions or applications may be taken or launched based on the content of the text (and, optionally, the environment and location in which the wearable device, and hence the user, is situated. In cases where the content of the text in the recognition window is ambiguous, the user may be prompted to make a selection between two or more possible actions and/or applications to be taken or launched as shown in FIG. 10B.

In the context of algorithm 800, a recognized text in the defined area or window recognized as "AAA" may indicate a user input to launch application 1 or take action A; a recognized text in the defined area or window recognized as "BBB" may indicate a user input to launch application 2 or take action B; a recognized text in the defined area or window recognized as "CCC" may indicate a user input to launch application 3 or take action C; a recognized text in the defined area or window recognized as "DDD" may indicate a user input to launch application 4 or take action D; and a recognized text in the defined area or window recognized as "AAA" may indicate a user input to launch application 5 or take action E. In some other embodiments, the relations between recognized texts and corresponding actions or the relations between recognized texts and corresponding applications may be differed, which should not be limited in this disclosure.

Moreover, in the context of algorithm 800, the location of the wearable device (e.g., apparatus 110) may also be determined. Correspondingly, a context may be determined based at least in part on the recognized text and the location of the wearable device (and any other pertinent information and/or data). Based on the determined context, appropriate action(s) may be taken and/or application(s) may be launched.

In scenario 1050, when there is ambiguity in the recognized text, apparatus 110 may present to the user (e.g., display visually and/or played audibly) a number of possible or likely selections for the user to select. Take FIG. 10B for example, when the text in the recognition window is "omlette", apparatus 110 may present selections to request the user to select between, for example and not limited to, searching for a definition of an omlette or translation for omlette.

Figure 11:
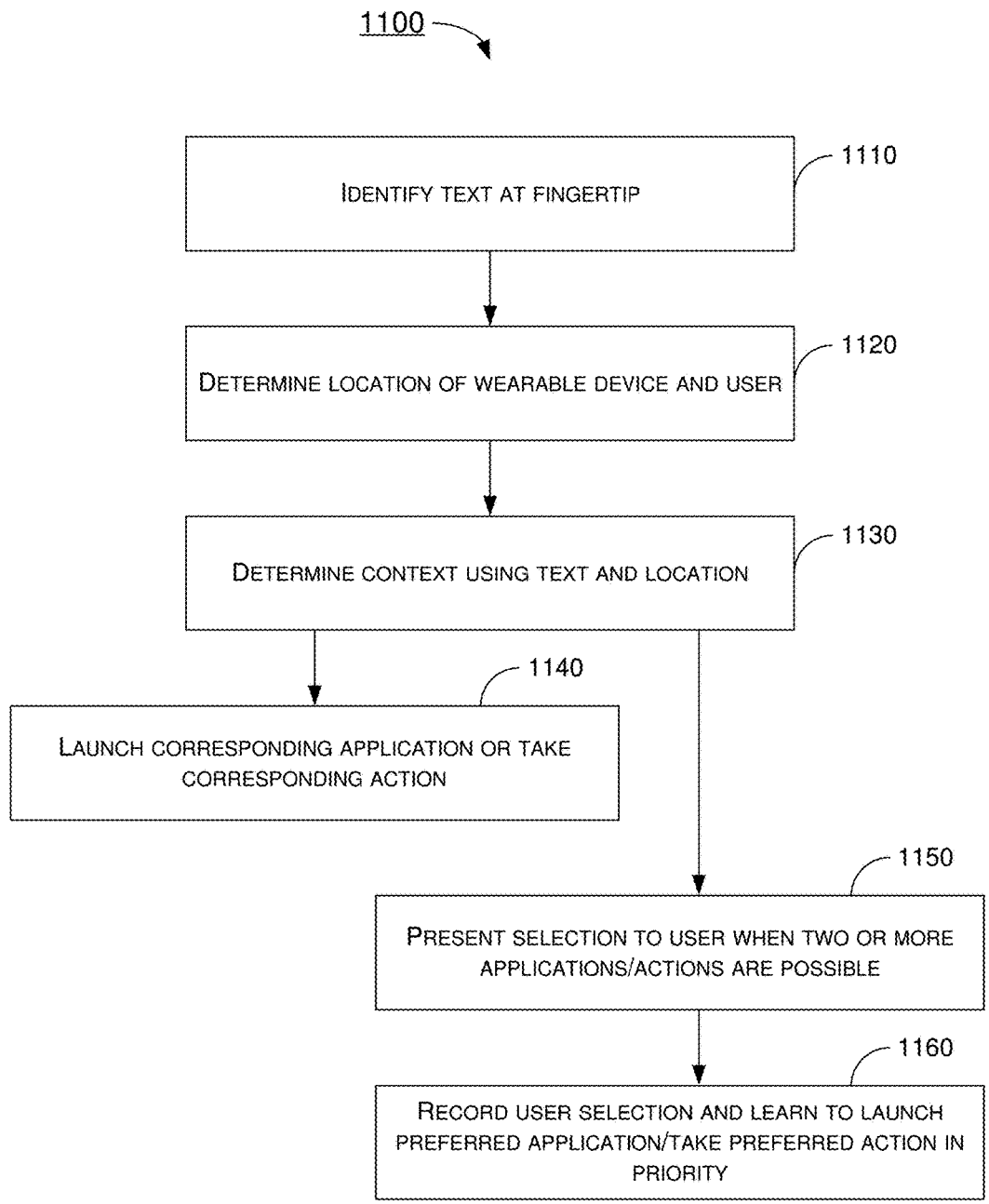
FIG. 11 is a diagram of an example algorithm in accordance with an implementation of the present disclosure.

FIG. 11 illustrates an example algorithm 1100 in accordance with an implementation of the present disclosure. Algorithm 1100 may include one or more operations, actions, or functions as represented by one or more blocks such as blocks 1110, 1120, 1130, 1140, 1150 and 1160. Although illustrated as discrete blocks, various blocks of algorithm 1100 may be divided into additional blocks, combined into fewer blocks, or eliminated, depending on the desired implementation. The blocks of algorithm 1100 may be performed in the order shown in FIG. 11 or in any other order, depending on the desired implementation. Algorithm 1100 may be implemented by apparatus 110. For illustrative purpose without limiting the scope of the present disclosure, the following description of algorithm 1100 is provided in the context of apparatus 110 although algorithm 1100 may be implemented by wearable devices other than apparatus 110. Algorithm 1100 may start at 1110.

At 1110, apparatus 110 may identify a fingertip of a hand of a user, and identify a text at the fingertip of the user. For instance, as with algorithm 800, apparatus 110 may automatically spread out a recognition window or a defined area around the identified fingertip in a fixed are, so that a text in the window or area may be recognized by apparatus 110. Algorithm 1100 may proceed from 1110 to 1120.

At 1120, apparatus 110 may determine the location of apparatus 110 (and presumably also the location of the user, when apparatus 110 is worn or otherwise carried by the user). For instance, apparatus 110 may determine its location using any of Wi-Fi signals, Global Positioning System (GPS) signals, any other suitable signals and/or mechanisms, or a combination thereof. Algorithm 1100 may proceed from 1120 to 1130.

At 1130, apparatus 110 may determine a context using the recognized text (or a content of the text) and the location of apparatus 110, so that apparatus 110 may take one or more actions and/or launch one or more applications corresponding to the context. Algorithm 1100 may proceed from 1130 to 1140 and/or 1150.

At 1140, apparatus 110 may take one or more actions and/or launch one or more applications corresponding to the context.

At 1150, apparatus 110 may present a list of possible or likely selections to the user for user selection when there are two or more possible actions to take and/or two or more possible applications to launch according to the determined context. Algorithm 1100 may proceed from 1150 to 1160.

At 1160, apparatus 110 may record and learn to launch the preferred application(s)/take the preferred action(s) in priority.

For illustrative purpose without limiting the scope of the present disclosure, a number of examples are described below to demonstrate possible implementations of algorithm 1100. When the text includes a series of numbers or the alphabets "TEL", apparatus 110 may launch a calling application (e.g., telephone, voice chatting or video chatting). When the text includes one or more geographical names and/or an address, apparatus 110 may launch a navigation application. When the text includes a date, apparatus 110 may launch a calendar application. When the text includes a movie name and the location of apparatus 110 is determined to be near or in the vicinity (e.g., within a configurable predefined or user-defined distance) of a movie theater, apparatus 110 may automatically search and present information (e.g., show times and ticket prices) about a movie under that movie name and/or launch a movie information application. When the text includes a name of a sports team and the location of apparatus 110 is determined to be near or in the vicinity (e.g., within a configurable predefined or user-defined distance) of a ball court, apparatus 110 may automatically search and present information (e.g., game times and ticket prices) about a game in which that sports team plays and/or launch a game information application. When the text includes a name of a food, entrée, appetizer or snack and the location of apparatus 110 is determined to be near or in the vicinity (e.g., within a configurable predefined or user-defined distance) of a restaurant, apparatus 110 may automatically search and present information (e.g., price, calories, health-related information, available reservation time slots) about the food, entrée, appetizer or snack and/or launch a restaurant information application. When the text includes any word and the location of apparatus 110 is determined to be not within a default country indicated in the settings of apparatus 110, apparatus 110 may automatically translate the word from one language to another language. When there are two or more possible applications to launch and/or two or more actions to take at a given time, apparatus 110 may present a list of selectable choices for the user to select which application and/or action to launch and/or undertake. In such cases, apparatus 110 may record and learn to launch the preferred application(s)/take the preferred action(s) in priority.

Figure 12:
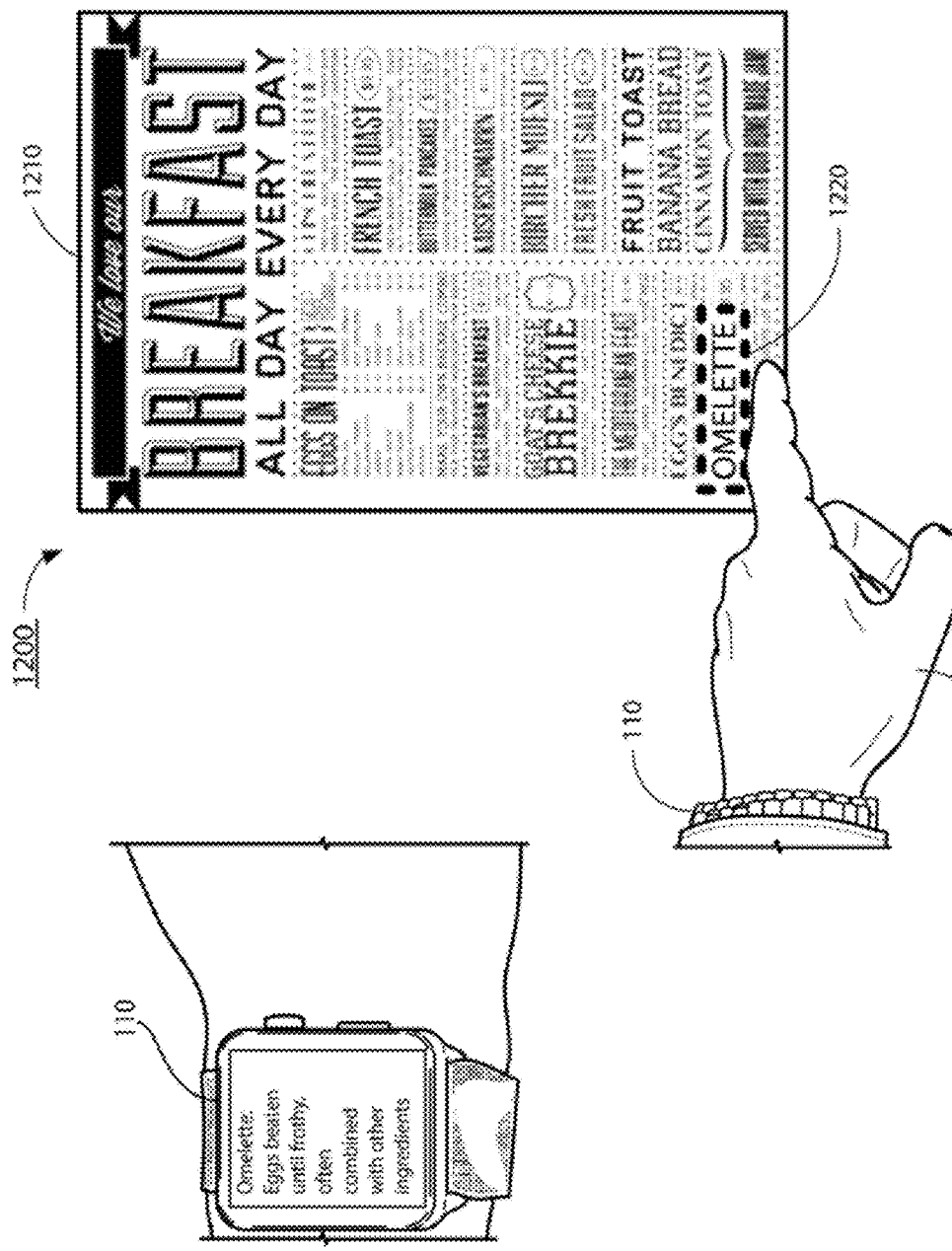
FIG. 12 is a diagram of an example scenario in accordance with an implementation of the present disclosure.

FIG. 12 illustrates an example scenario 1200 in accordance with an implementation of the present disclosure. Scenario 1200 may be an example implementation of algorithm 800 and/or algorithm 1100. In scenario 1200, a window or area around the tip of a finger of a hand of a user (e.g., first hand 120) may contain a particular text 1220 which is shown on an object 1210 (e.g., a restaurant menu). In the example shown in FIG. 12, the content of text 1220 includes the word "omelette" and, accordingly, apparatus 110 may automatically search and present information (e.g., definition) of the word "omelette".

Figure 13:
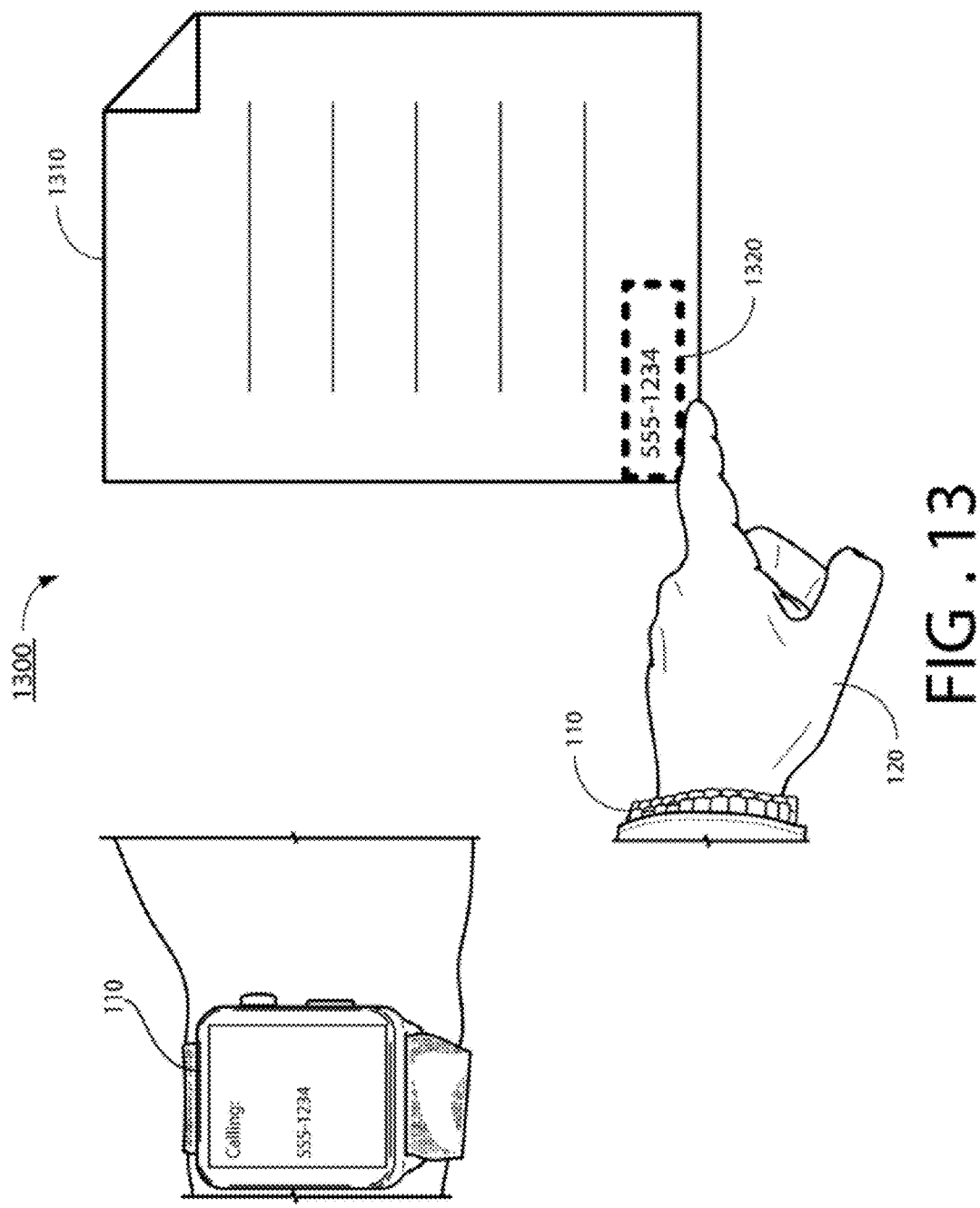
FIG. 13 is a diagram of an example scenario in accordance with an implementation of the present disclosure.

FIG. 13 illustrates an example scenario 1300 in accordance with an implementation of the present disclosure. Scenario 1300 may be an example implementation of algorithm 800 and/or algorithm 1100. In scenario 1300, a window or area around the tip of a finger of a hand of a user (e.g., first hand 120) may contain a particular text 1320 which is shown on an object 1310 (e.g., a letter, a document, a piece of paper, a business card, a phone book, an address book). In the example shown in FIG. 13, the content of text 1320 may include a series or string of numbers and, accordingly, apparatus 110 may automatically launch a calling application and dial up a telephone number using the series or string of numbers in text 1320.

Figure 14:
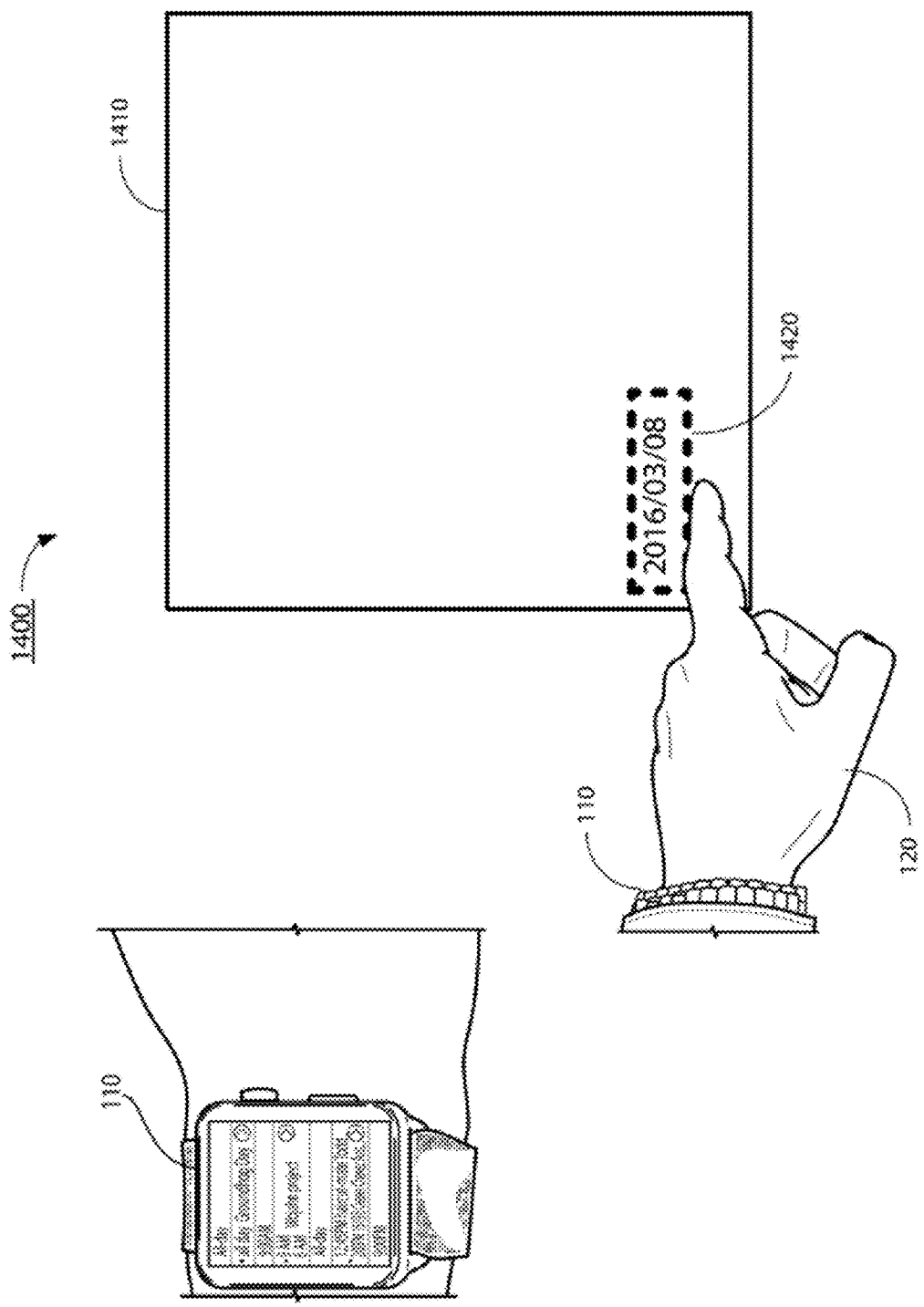
FIG. 14 is a diagram of an example scenario in accordance with an implementation of the present disclosure.

FIG. 14 illustrates an example scenario 1400 in accordance with an implementation of the present disclosure. Scenario 1400 may be an example implementation of algorithm 800 and/or algorithm 1100. In scenario 1400, a window or area around the tip of a finger of a hand of a user (e.g., first hand 120) may contain a particular text 1420 which is shown on an object 1410 (e.g., a calendar, a note book, a piece of paper, a document). In the example shown in FIG. 14, the content of text 1420 includes a date or part of a date and, accordingly, apparatus 110 may automatically launch a calendar application or a to-do list for the date.

Figure 15:
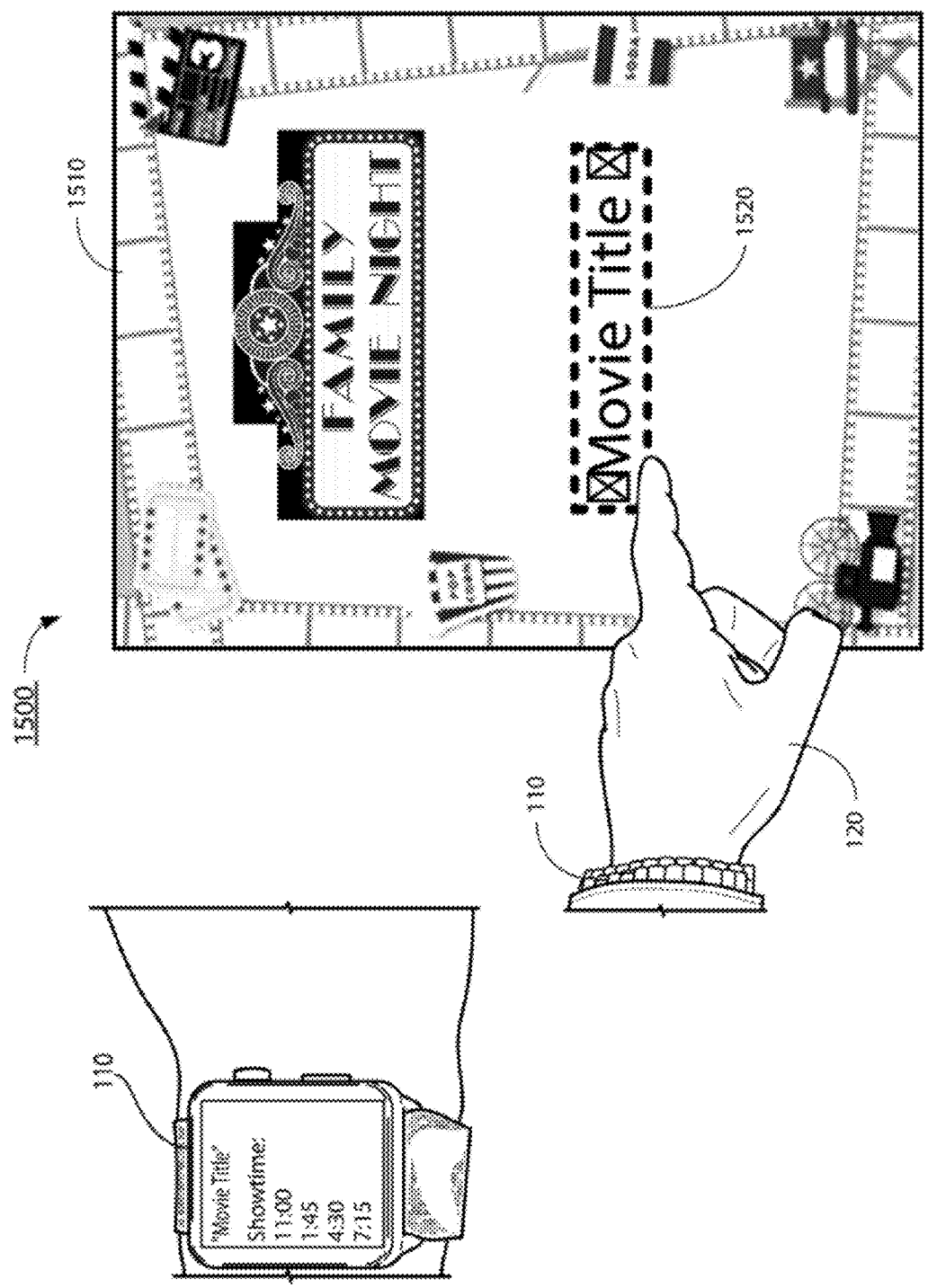
FIG. 15 is a diagram of an example scenario in accordance with an implementation of the present disclosure.

FIG. 15 illustrates an example scenario 1500 in accordance with an implementation of the present disclosure. Scenario 1500 may be an example implementation of algorithm 800 and/or algorithm 1100. In scenario 1500, a window or area around the tip of a finger of a hand of a user (e.g., first hand 120) may contain a particular text 1520 which is shown on an object 1510 (e.g., a move poster). In the example shown in FIG. 15, the content of text 1520 includes a title of a movie and, accordingly, apparatus 110 may automatically search and present information (e.g., show times, ticket prices and location(s) of nearby movie theater(s) showing such movie) related to the movie under that title.

Figure 16:
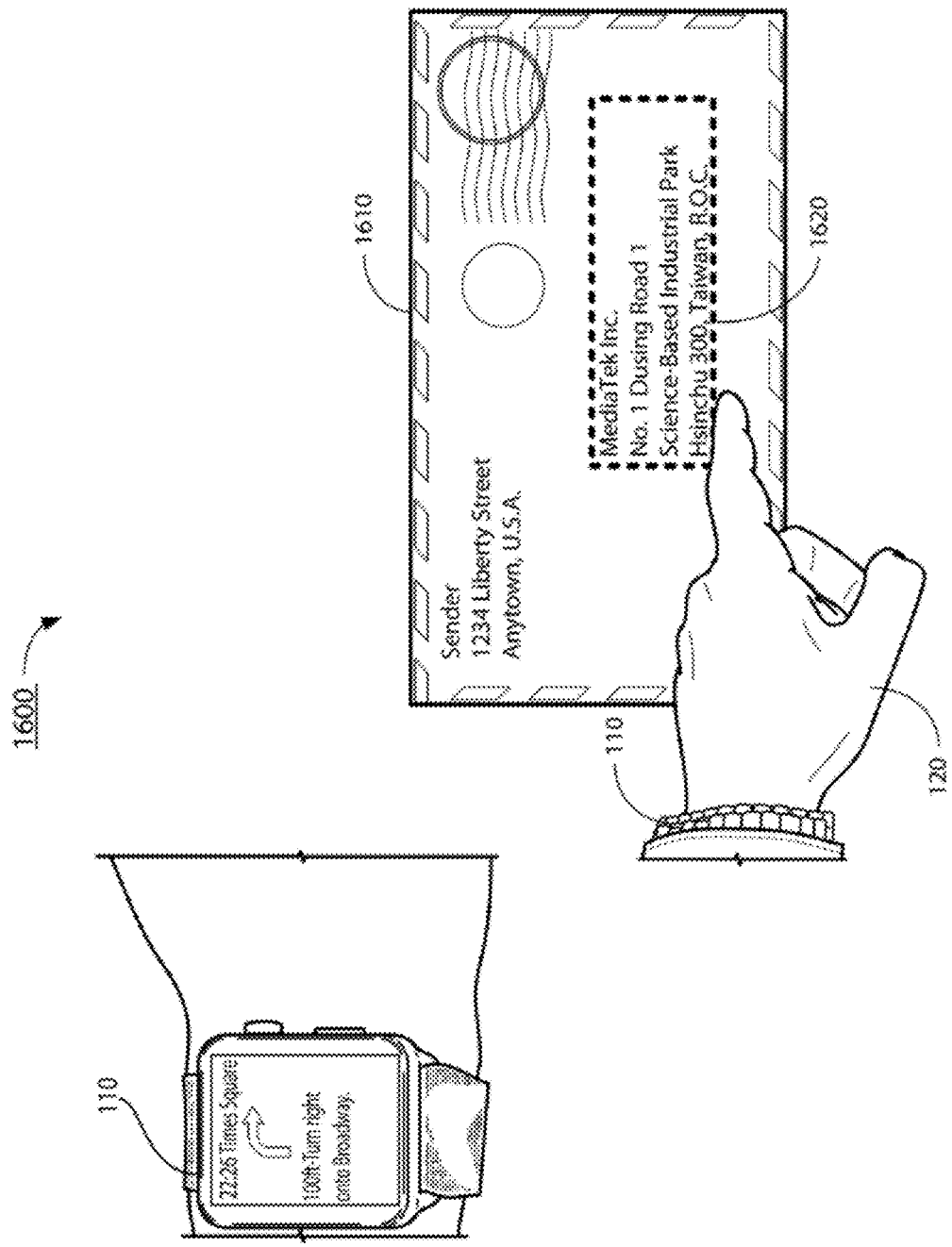
FIG. 16 is a diagram of an example scenario in accordance with an implementation of the present disclosure.

FIG. 16 illustrates an example scenario 1600 in accordance with an implementation of the present disclosure. Scenario 1600 may be an example implementation of algorithm 800 and/or algorithm 1100. In scenario 1600, a window or area around the tip of a finger of a hand of a user (e.g., first hand 120) may contain a particular text 1620 which is shown on an object 1610 (e.g., a letter, an address book, a note book). In the example shown in FIG. 16, the content of text 1620 includes an address and, accordingly, apparatus 110 may automatically launch a navigation application to guide the user to move from current location to the particular address.

Example Implementations

Figure 17:
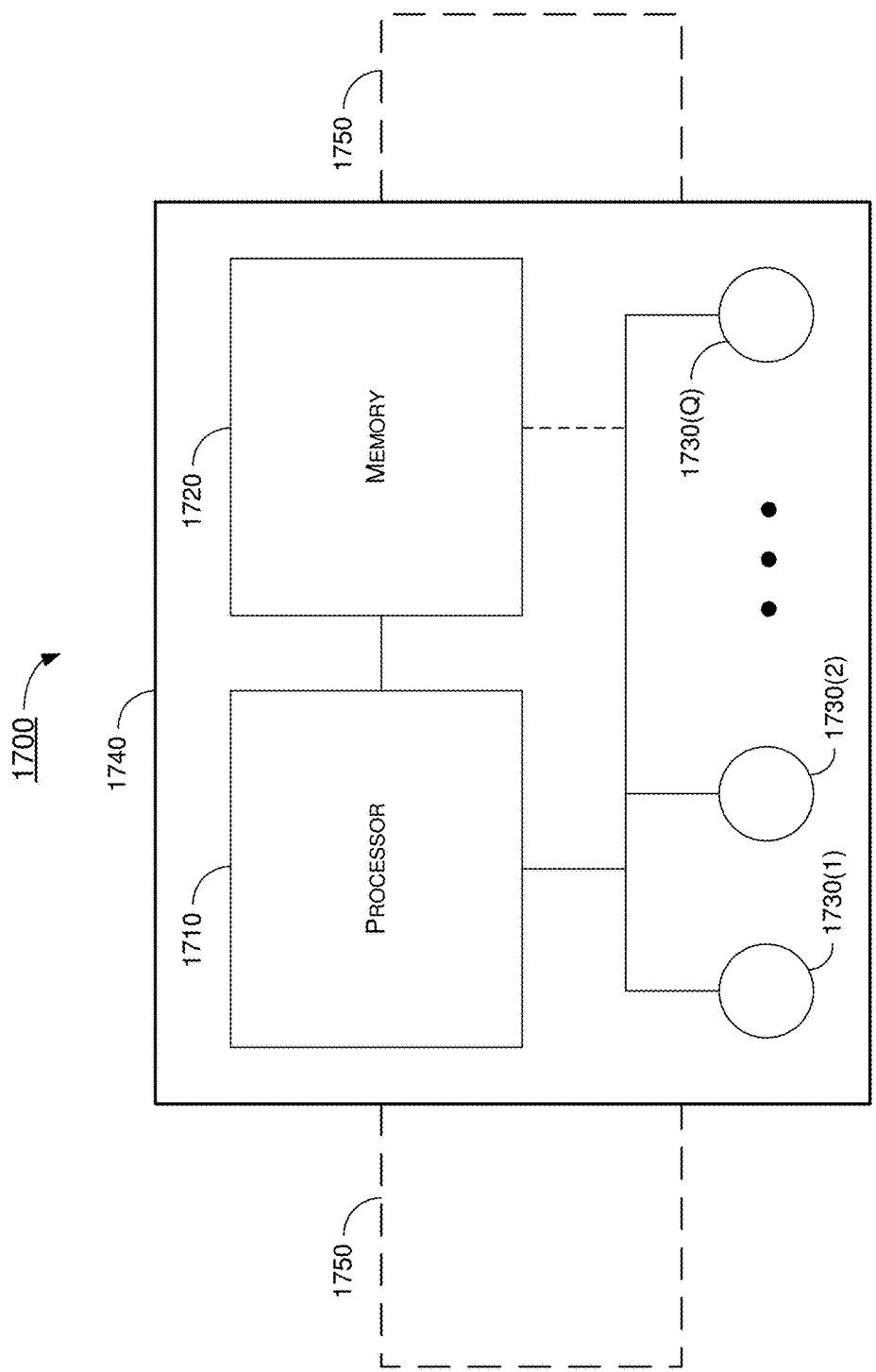
FIG. 17 is a block diagram of an example apparatus in accordance with an implementation of the present disclosure.

FIG. 17 illustrates an example apparatus 1700 in accordance with an implementation of the present disclosure. Apparatus 1700 may be an example implementation of apparatus 110. Apparatus 1700 may perform various functions to implement techniques, schemes and methods described herein, including overview 100, scenario 200, scenario 300, algorithm 400, algorithm 500, scenario 600, algorithm 700, algorithm 800, scenario 900, scenario 1000, scenario 1050, algorithm 1100, scenario 1200, scenario 1300, scenario 1400, scenario 1500 and scenario 1600 described above as well as algorithm 400 and processes 1800 and 1900 described below. In some implementations, apparatus 1700 may be an electronic apparatus which may be a wearable device such as, for example, a smartphone, smartwatch, smart bracelet, smart wristband, smart necklace or any portable device that can be worn or carried by a user.

Apparatus 1700 may include at least those components shown in FIG. 17, such as a processor 1710, a memory 1720, one or more operational components 1730(1)-1730(Q), with Q being a positive integer greater than or equal to 1, and a casing 1740 that contains processor 1710, memory 1720 and one or more operational components 1730(1)-1730(Q) therein. Optionally, apparatus 1700 may also include an appendage mechanism 1750 coupled to casing 1740 and configured to attach to a user. In some other embodiments, appendage mechanism 1750 may be replaced with any other wearing structure to attach casing 1740 to a user, which should not be limited in this disclosure. Processor 1710 may be communicatively and/or operably coupled to memory 1720 and each of one or more operational components 1730(1)-1730(Q). Optionally, memory 1720 may also be communicatively and/or operably coupled to at least one of one or more operational components 1730(1)-1730(Q).

The one or more operational components 1730(1)-1730(Q) may be configured to sense a user input related to at least one or more movements, one or more touches, one or more gestures, one or more poses or an area pointed by a hand (e.g., first hand 120 or second hand 130) of a user.

Memory 1720 may be configured to store multiple processor-executable sets of instructions corresponding to multiple applications. Memory 1720 may include one or more computer-readable mediums such as a type of read-only memory (ROM) or random-access memory (RAM). For example, memory 1720 may include a dynamic RAM (DRAM), static RAM (SRAM), thyristor RAM (T-RAM), zero-capacitor RAM (Z-RAM) or another type of volatile memory. As another example, memory device may include mask ROM, programmable ROM (PROM), erasable programmable ROM (EPROM), electrically-erasable programmable ROM (EEPROM), flash memory, solid-state memory or another type of non-volatile memory.

Processor 1710 may be implemented in the form of a single integrated-circuit (IC) chip or a chipset of multiple IC chips. For instance, processor 1710 may be an application-specific integrated circuit (ASIC), a micro-controller unit (MCU), a system-on-chip (SOC) or a central processing unit (CPU) of apparatus 1700. Processor 1710 may be configured to perform operations a number of operations. For instance, processor 1710 may analyze the user input and perform one or more operations responsive to the user input.

In some implementations, at least one operational component of the one or more operational components 1730(1)-1730(Q) may be configured to receive a visual image of at least a part of the hand of the user. Correspondingly, in analyzing the user input, processor 1710 may be configured to count a number of fingers extended from the hand of the user. In some implementations, in performing the one or more operations responsive to the user input, processor 1710 may be configured to launch one of the plurality of applications corresponding to the counted number of fingers.

Alternatively or additionally, at least one operational component of the one or more operational components 1730(1)-1730(Q) may be configured to receive a visual image of at least a part of the hand of the user. Correspondingly, in analyzing the user input, processor 1710 may be configured to perform a number of operations. For instance, processor 1710 may identify a fingertip of the hand, define an area around the fingertip based on the area pointed by the user, and recognize a text in the defined area around the fingertip. In some implementations, in analyzing the user input, processor 1710 may be configured to further perform a number of operations. For instance, processor 1710 may determine a location of the wearable device, determine a context based at least in part on the determined location and the recognized text, and launch one of a plurality of applications corresponding to the determined context.

In some implementations, the one or more operational components 1730(1)-1730(Q) may include a wide-view camera, a fisheye camera, a depth sensor, or a combination thereof. In some implementations, a tilt angle between a bezel of apparatus 1700 and the wide-view camera and/or fisheye camera so as to prevent a view of the camera from being blocked.

In some implementations, at least one operational component of the one or more operational components 1730(1)-1730(Q) may be configured to transmit mechanical waves or electromagnetic waves toward a surface associated with the user, and at least another operational component of the one or more operational components 1730(1)-1730(Q) may be configured to receive a reflected portion of the mechanical waves or electromagnetic waves. Correspondingly, in analyzing the user input, processor 1710 may be configured to perform a number of operations. For instance, processor 1710 may analyze the reflected portion of the mechanical waves or electromagnetic waves to determine a user input from the user, and perform one or more operations responsive to the user input. In some implementations, the surface associated with the user may include a surface associated with a limb of the user on which apparatus 1700 is worn.

In some implementations, the mechanical waves or electromagnetic waves may include an optical signal. At least one operational component of the one or more operational components 1730(1)-1730(Q) may include an infrared light-emitting diode (IR LED), a visible blue LED or any other type of light source. At least another operational component of the one or more operational components 1730(1)-1730(Q) may include one or more photodetectors. In some implementations, in analyzing the reflected portion of the mechanical waves or electromagnetic waves, processor 1710 may be configured to perform a number of operations. For instance, processor 1710 may interpret the reflected portion of the mechanical waves or electromagnetic waves as a series of overlapped image frames, identify one or more common features in the series of overlapped image frames to recognize a touch movement by the user, and determine one of a plurality of hand gestures corresponding to the touch movement as the user input.

Alternatively or additionally, the mechanical waves or electromagnetic waves may include an acoustic signal. At least one operational component of the one or more operational components 1730(1)-1730(Q) may include an ultrasonic speaker or any other type of sound source. At least another operational component of the one or more operational components 1730(1)-1730(Q) may include a microphone. In some implementations, in analyzing the reflected portion of the mechanical waves or electromagnetic waves, processor 1710 may be configured to perform a number of operations. For instance, processor 1710 may interpret the reflected portion of the mechanical waves or electromagnetic waves as a series of overlapped pictures, identify one or more common features in the series of overlapped pictures to recognize a touch movement by the user, and determine a 2D gesture corresponding to the touch movement as the user input.

In some implementations, the user input may include at least one or a combination of a swipe by a hand of the user, a tap by the hand, a press by the hand, a pinching motion by the hand, and a spreading motion by the hand.

Figure 18:
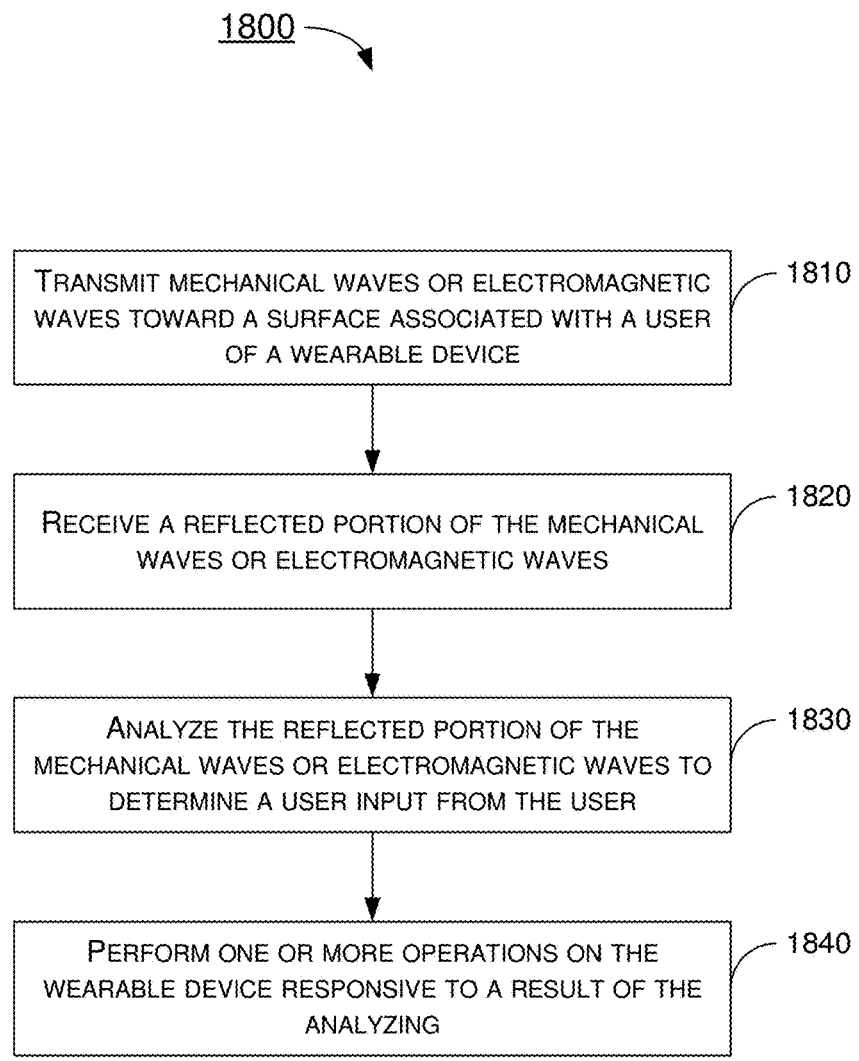
FIG. 18 is a flowchart of an example process in accordance with an implementation of the present disclosure.

FIG. 18 illustrates an example process 1800 in accordance with an implementation of the present disclosure. Process 1800 may be an example implementation of algorithm 400 and/or algorithm 500, and may result in one or more of overview 100, scenario 200, scenario 300 and/or scenario 600, a combination thereof or a variation thereof. Process 1800 may include one or more operations, actions, or functions as represented by one or more blocks such as blocks 1810, 1820, 1830 and 1840. Although illustrated as discrete blocks, various blocks of process 1800 may be divided into additional blocks, combined into fewer blocks, or eliminated, depending on the desired implementation. The blocks may be performed in the order shown in FIG. 18 or in any other order, depending on the desired implementation. Process 1800 may be implemented by apparatus 110 and apparatus 1700. Solely for illustrative purpose and without limiting the scope of the present disclosure, process 1800 is described below in the context of process 1800 being performed by apparatus 1700. Process 1800 may begin at 1810.

At 1810, process 1800 may involve apparatus 1700 transmitting mechanical waves or electromagnetic waves toward a surface associated with a user of apparatus 1700. Process 1800 may proceed from 1810 to 1820.

At 1820, process 1800 may involve apparatus 1700 receiving a reflected portion of the mechanical waves or electromagnetic waves. Process 1800 may proceed from 1820 to 1830.

At 1830, process 1800 may involve apparatus 1700 analyzing the reflected portion of the mechanical waves or electromagnetic waves to determine a user input from the user. Process 1800 may proceed from 1830 to 1840.

At 1840, process 1800 may involve apparatus 1700 performing one or more operations on apparatus 1700 responsive to a result of the analyzing.

In some implementations, the surface associated with the user may include a surface associated with a limb (e.g., an arm) of the user on which apparatus 1700 is worn.

In some implementations, in transmitting the mechanical waves or electromagnetic waves, process 1800 may involve apparatus 1700 transmitting an optical signal with one or more IR LEDs, one or more visible blue LEDs or any other type of light source. Moreover, in receiving, process 1800 may involve apparatus 1700 receiving by one or more photodetectors. In some implementations, in analyzing the reflected portion of the mechanical waves or electromagnetic waves, process 1800 may involve apparatus 1700 performing a number of operations. For instance, process 1800 may involve apparatus 1700 interpreting the reflected portion of the mechanical waves or electromagnetic waves as a series of overlapped image frames, identifying one or more common features in the series of overlapped image frames to recognize a touch movement by the user, and determining a hand gesture corresponding to the touch movement as the user input, the determined hand gesture corresponding to an application to be launched as one of the one or more operations to be performed.

Alternatively or additionally, in transmitting the mechanical waves or electromagnetic waves, process 1800 may involve apparatus 1700 transmitting an acoustic signal with an ultrasonic speaker. Moreover, in receiving, process 1800 may involve apparatus 1700 receiving by a microphone. In some implementations, in analyzing the reflected portion of the mechanical waves or electromagnetic waves, process 1800 may involve apparatus 1700 performing a number of operations. For instance, process 1800 may involve apparatus 1700 interpreting the reflected portion of the mechanical waves or electromagnetic waves as a series of overlapped pictures, identifying one or more common features in the series of overlapped pictures to recognize a touch movement by the user, and determining a 2D gesture corresponding to the touch movement as the user input, the determined 2D gesture corresponding to an application to be launched as one of the one or more operations to be performed.

In some implementations, the user input may include at least one or a combination of a swipe by a hand of the user, a tap by the hand, a press by the hand, a pinching motion by the hand, and a spreading motion by the hand.

Figure 19:
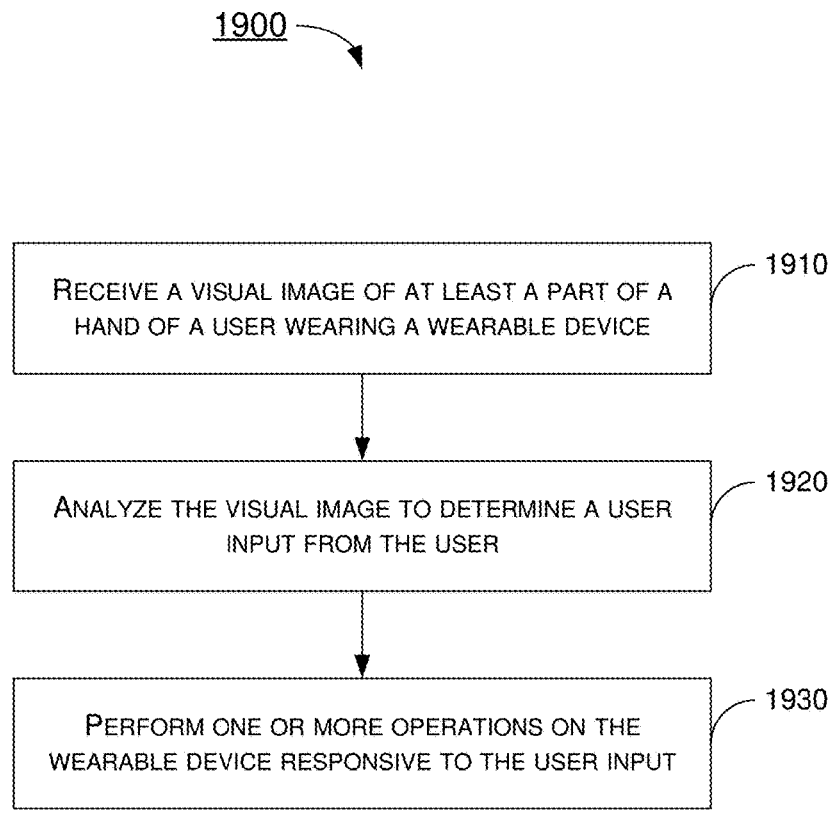
FIG. 19 is a flowchart of an example process in accordance with an implementation of the present disclosure.

FIG. 19 illustrates an example process 1900 in accordance with an implementation of the present disclosure. Process 1900 may be an example implementation of algorithm 700, algorithm 800 and/or algorithm 1100, and may result in one or more of overview 100, scenario 900, scenario 1000, scenario 1050, scenario 1200, scenario 1300, scenario 1400, scenario 1500 and/or scenario 1600, a combination thereof or a variation thereof. Process 1900 may include one or more operations, actions, or functions as represented by one or more blocks such as blocks 1910, 1920 and 1930. Although illustrated as discrete blocks, various blocks of process 1900 may be divided into additional blocks, combined into fewer blocks, or eliminated, depending on the desired implementation. The blocks may be performed in the order shown in FIG. 19 or in any other order, depending on the desired implementation. Process 1900 may be implemented by apparatus 110 and apparatus 1700. Solely for illustrative purpose and without limiting the scope of the present disclosure, process 1900 is described below in the context of process 1900 being performed by apparatus 1700. Process 1900 may begin at 1910.

At 1910, process 1900 may involve apparatus 1700 receiving a visual image of at least a part of a hand of a user wearing apparatus 1700. Process 1900 may proceed from 1910 to 1920.

At 1920, process 1900 may involve apparatus 1700 analyzing the visual image to determine a user input from the user. Process 1900 may proceed from 1920 to 1930.

At 1930, process 1900 may involve apparatus 1700 performing one or more operations on apparatus 1700 responsive to the user input.

In some implementations, in analyzing the visual image to determine the user input, process 1900 may involve apparatus 1700 counting a number of fingers extended from the hand of the user. In some implementations, in performing the one or more operations on apparatus 1700 responsive to the user input, process 1900 may involve apparatus 1700 launching one of a plurality of applications corresponding to the counted number of fingers.

Alternatively or additionally, in analyzing the visual image to determine the user input, process 1900 may involve apparatus 1700 performing a number of operations. For instance, process 1900 may involve apparatus 1700 identifying a fingertip of the hand, defining an area around the fingertip, and recognizing a text in the defined area around the fingertip. In some implementations, process 1900 may also involve apparatus 1700 perform additional operations. For instance, process 1900 may involve apparatus 1700 determining a location of apparatus 1700 and determining a context based at least in part on the determined location and the recognized text. In some implementations, in performing the one or more operations on apparatus 1700 responsive to the user input, process 1900 may involve apparatus 1700 launching one of a plurality of applications corresponding to the determined context.

In some implementations, in receiving the visual image, process 1900 may involve apparatus 1700 receiving the visual image by a wide-view camera, a fisheye camera, a depth sensor, or a combination thereof.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any multiple and/or singular terms herein, those having skill in the art can translate from the multiple to the singular and/or from the singular to the multiple as is appropriate to the context and/or application. The various singular/multiple permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. An apparatus, comprising:
   one or more operational components configured to sense a user input related to at least one or more movements, one or more touches of an other hand of the user, one or more gestures, and one or more poses or an area pointed by a hand;
   a memory configured to store a plurality of processor-executable sets of instructions corresponding to a plurality of applications;
   a processor communicatively coupled to the one or more operational components and the memory, the processor configured to perform operations comprising:
      analyzing the user input; and
      performing one or more operations responsive to the user input; and
   a casing containing the one or more operational components, the memory and the processor therein,
   wherein each of the one or more movements, the one or more touches of the other hand of the user, the one or more gestures, and the one or more poses is performed without reference to or contacting a touch-responsive device, a touch-sensing device or a display device.

2. The apparatus of claim 1, wherein at least one operational component of the one or more operational components is configured to receive a visual image of at least a part of the hand, and wherein, in analyzing the user input, the processor is configured to count a number of fingers extended from the hand.

3. The apparatus of claim 2, wherein, in performing the one or more operations responsive to the user input, the processor is configured to launch one of the plurality of applications corresponding to the counted number of fingers.

4. The apparatus of claim 1, wherein at least one operational component of the one or more operational components is configured to receive a visual image of at least a part of the hand, and wherein, in analyzing the user input, the processor is configured to perform operations comprising:
   identifying a fingertip of the hand;
   defining an area around the fingertip based on the area pointed by the fingertip; and
   recognizing a text in the defined area around the fingertip.

5. The apparatus of claim 4, wherein, in analyzing the user input, the processor is configured to further perform operations comprising:
   determining a location of the apparatus;
   determining a context based at least in part on the determined location and the recognized text; and
   launching one of a plurality of applications corresponding to the determined context.

6. The apparatus of claim 1, wherein the one or more operational components comprise a wide-view camera, a fisheye camera, a depth sensor, or a combination thereof.

7. The apparatus of claim 1, wherein at least one operational component of the one or more operational components is configured to transmit mechanical waves or electromagnetic waves toward a surface, wherein at least another operational component of the one or more operational components is configured to receive a reflected portion of the mechanical waves or electromagnetic waves, and wherein, in analyzing the user input, the processor is configured to perform operations comprising:
   analyzing the reflected portion of the mechanical waves or electromagnetic waves to determine a user input; and
   performing one or more operations responsive to the user input.

8. The apparatus of claim 7, wherein the surface comprises a surface associated with a limb.

9. The apparatus of claim 7, wherein the mechanical waves or electromagnetic waves comprise an optical signal, wherein the at least one operational component comprises an infrared light-emitting diode (IR LED) or a visible blue LED, and wherein the at least another operational component comprises one or more photodetectors.

10. The apparatus of claim 9, wherein, in analyzing the reflected portion of the mechanical waves or electromagnetic waves, the processor is configured to perform operations comprising:
   interpreting the reflected portion of the mechanical waves or electromagnetic waves as a series of image frames;
   identifying one or more common features in the series of image frames to recognize a touch movement by the user; and
   determining one of a plurality of hand gestures corresponding to the touch movement as the user input.

11. The apparatus of claim 7, wherein the mechanical waves or electromagnetic waves comprise an acoustic signal, wherein the at least one operational component comprises an ultrasonic speaker, and wherein the at least another operational component comprises a microphone.

12. The apparatus of claim 11, wherein, in analyzing the reflected portion of the mechanical waves or electromagnetic waves, the processor is configured to perform operations comprising:
   interpreting the reflected portion of the mechanical waves or electromagnetic waves as a series of pictures;
   identifying one or more common features in the series of pictures to recognize a touch movement; and
   determining a two-dimensional (2D) gesture corresponding to the touch movement as the user input.

13. The apparatus of claim 7, wherein the user input comprises at least one or a combination of a swipe by a hand, a tap by the hand, a press by the hand, a pinching motion by the hand, and a spreading motion by the hand.

* * * * *